US012073982B2

(12) United States Patent
Kanemoto et al.

(10) Patent No.: US 12,073,982 B2
(45) Date of Patent: Aug. 27, 2024

(54) INDUCTOR COMPONENT

(71) Applicant: Murata Manufacturing Co., Ltd., Kyoto-fu (JP)

(72) Inventors: Riku Kanemoto, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 695 days.

(21) Appl. No.: 17/158,922

(22) Filed: Jan. 26, 2021

(65) Prior Publication Data

US 2021/0233701 A1 Jul. 29, 2021

(30) Foreign Application Priority Data

Jan. 27, 2020 (JP) ................................ 2020-010785

(51) Int. Cl.

*H01F 27/28* (2006.01)
*H01F 17/04* (2006.01)
*H01F 27/29* (2006.01)
*H01F 27/32* (2006.01)

(52) U.S. Cl.

CPC ......... *H01F 27/2823* (2013.01); *H01F 17/04* (2013.01); *H01F 27/29* (2013.01); *H01F 27/324* (2013.01); *H01F 2017/048* (2013.01)

(58) Field of Classification Search

CPC ...... H01F 27/2823; H01F 17/04; H01F 27/29; H01F 27/324; H01F 2017/048
See application file for complete search history.

(56) References Cited

U.S. PATENT DOCUMENTS

2007/0045773 A1* 3/2007 Mi ...................... H01L 27/0688 336/200
2009/0085707 A1* 4/2009 Mi .......................... H01F 27/29 336/200
2010/0201473 A1* 8/2010 Konoue .............. H01F 17/0013 336/200
2012/0326827 A1* 12/2012 Nanjyo ............... H01F 17/0033 336/200
2014/0009254 A1* 1/2014 Ohkubo .............. H01F 17/0033 336/192
2014/0266547 A1* 9/2014 Watanabe ............. H01F 41/042 336/200
2017/0200554 A1* 7/2017 Kudo ...................... H01F 27/36
2017/0301462 A1* 10/2017 Dela Cruz .......... H01F 27/2823
2018/0218829 A1* 8/2018 Endo ................... H01F 17/0013
2019/0088402 A1* 3/2019 Kim ........................ H01F 27/29
2019/0362873 A1* 11/2019 Arai .......................... H01F 5/04

(Continued)

FOREIGN PATENT DOCUMENTS

CN 1925321 A 3/2007
CN 110136921 A 8/2019

(Continued)

*Primary Examiner* — Malcolm Barnes
(74) *Attorney, Agent, or Firm* — Studebaker & Brackett PC

(57) ABSTRACT

An inductor component includes a body that includes a magnetic layer, an inductor wire that is provided in the body, and a vertical wire that is provided in the body and that extends to a first principal surface from a contact portion of the vertical wire that is in contact with the inductor wire. The vertical wire is in contact with the inductor wire in such a manner as to extend over a first side surface and a third side surface of the inductor wire.

20 Claims, 16 Drawing Sheets

(56) References Cited

U.S. PATENT DOCUMENTS

| | | | | |
|---|---|---|---|---|
| 2020/0051728 | A1* | 2/2020 | Matsumoto | H01F 17/0013 |
| 2020/0335263 | A1* | 10/2020 | Jeon | H01F 27/29 |

FOREIGN PATENT DOCUMENTS

| | | | |
|---|---|---|---|
| JP | 2007-067236 | A | 3/2007 |
| JP | 2014-179453 | A | 9/2014 |
| JP | 6024243 | B2 | 11/2016 |
| JP | 2017-199801 | A | 11/2017 |
| JP | 2019-134141 | A | 8/2019 |

* cited by examiner

INDUCTOR COMPONENT

CROSS-REFERENCE TO RELATED APPLICATION

This application claims benefit of priority to Japanese Patent Application No. 2020-010785, filed Jan. 27, 2020, the entire content of which is incorporated herein by reference.

BACKGROUND

Technical Field

The present disclosure relates to an inductor component.

Background Art

An inductor component that is described in Japanese Patent No. 6024243 includes a pair of magnetic layers that include a resin and metal magnetic powder contained in the resin, and a spiral conductor that is interposed between the pair of magnetic layers. The spiral conductor is covered with an insulating resin layer. The inductor component also includes a bump electrode that extends through the magnetic layers and the insulating resin layer to realize conduction between the spiral conductor and an external terminal by using the bump electrode.

Inductor components as that described above are expected to have improved connection strength between the spiral conductor and the bump electrode.

SUMMARY

According to preferred embodiments of the present disclosure, an inductor component includes a body that includes a magnetic layer and that has a first principal surface and a second principal surface, an inductor wire that extends along a predetermined plane in the body, and a vertical wire that is provided in the body, that is in contact with the inductor wire, and that extends to the first principal surface from a contact portion of the vertical wire that is in contact with the inductor wire. The second principal surface is positioned on a side opposite to the first principal surface with the inductor wire being interposed between the second principal surface and the first principal surface. A direction along both a transverse section of the inductor wire and the predetermined plane is defined as a width direction of the inductor wire, and, among directions along the transverse section, a direction orthogonal to the width direction is defined as a thickness direction of the inductor wire, the transverse section of the inductor wire being orthogonal to a direction of extension of the inductor wire. In addition, among side surfaces of the inductor wire, a side surface that is positioned on a first side in the width direction is defined as a first side surface, a side surface that is positioned on a second side in the width direction is defined as a second side surface, a side surface that is positioned between the first side surface and the second side surface in the width direction and that is positioned closer than both the first side surface and the second side surface to the first principal surface in the thickness direction is defined as a third side surface, and a side surface that is positioned between the first side surface and the second side surface in the width direction and that is positioned closer than both the first side surface and the second side surface to the second principal surface in the thickness direction is defined as a fourth side surface. In these cases, the vertical wire is in contact with the inductor wire in such a manner as to extend over the first side surface and the third side surface.

According to the structure above, the vertical wire is in contact with the inductor wire in such a manner as to extend over both the first side surface and the third side surface among the side surfaces of the inductor wire. Therefore, it is possible to increase the area of the contact portion of the vertical wire that is in contact with the inductor wire compared to that when the vertical wire is in contact with only the third side surface among the side surfaces of the inductor wire. In addition, it is possible to bring the vertical wire into contact with the inductor wire from a plurality of directions. Therefore, it is possible to increase the connection strength between the inductor wire and the vertical wire.

The inductor wire above makes it possible to increase the connection strength between the inductor wire and the vertical wire.

Other features, elements, characteristics and advantages of the present disclosure will become more apparent from the following detailed description of preferred embodiments of the present disclosure with reference to the attached drawings.

DETAILED DESCRIPTION

First Embodiment

An embodiment of an inductor component is described below in accordance with FIGS. 1 to 22. Note that in order to make it easier to understand the drawings, components may be shown in enlarged forms. Dimensional ratios of the components may differ from actual dimensional ratios or dimensional ratios in other figures. In the sectional views, illustrated portions are hatched. However, in order to make it easier to understand the drawings, some of the components are sometimes not hatched.

Figure 1:
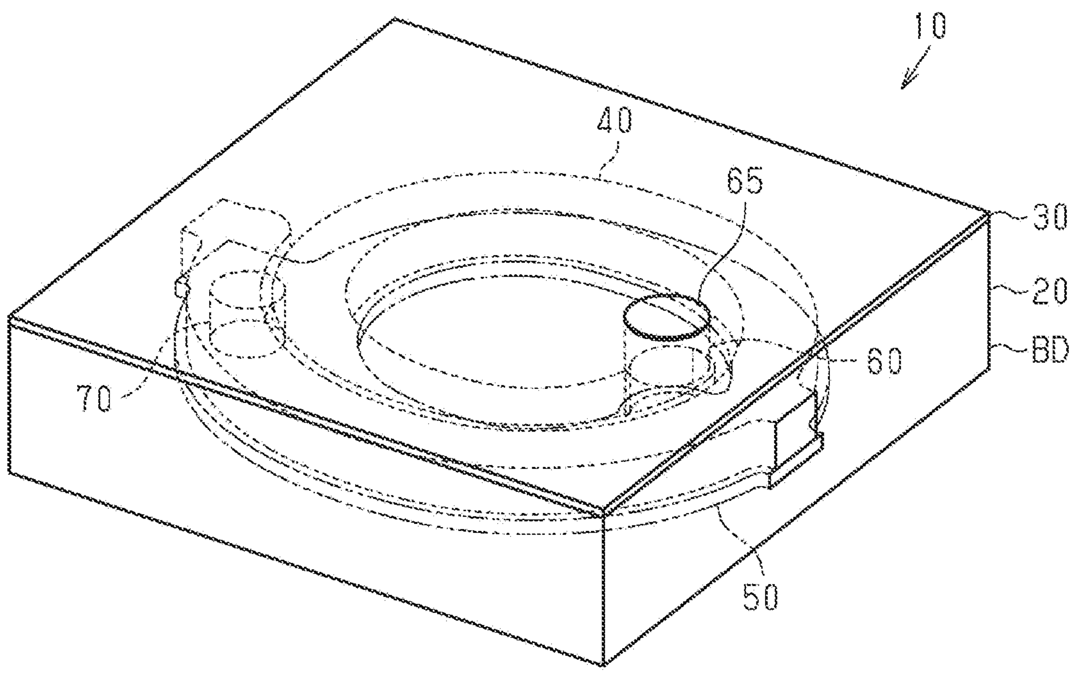
FIG. 1 is a schematic perspective view of a first embodiment of an inductor component.

As shown in FIG. 1, a body BD of an inductor component 10 includes a magnetic layer 20 that is made of a magnetic material. The magnetic layer 20 is made of, for example, a resin including metal magnetic powder. When the magnetic layer 20 is to be made of a resin including metal magnetic powder, as the metal magnetic powder, for example, iron, nickel, chromium, copper, aluminum, or an alloy thereof can be used. As the resin including the metal magnetic powder, resin materials, such as epoxy resin, can be used. Considering insulating properties and moldability, it is desirable to use polyimide resin, acrylic resin, or phenol resin as the resin. Note that, in the magnetic layer 20, it is desirable that the wt % of the metal magnetic powder be about 60 wt % or greater with respect to the entire wt %. In order to increase a filling ability when the resin including the metal magnetic powder is used, it is further desirable that the resin include two or three types of the metal magnetic powder having different particle size distributions.

Note that the magnetic layer 20 may be made of a resin including ferrite powder instead of the metal magnetic powder, or may be made of a resin including both the metal magnetic powder and the ferrite powder. For example, the magnetic layer 20 may be a substrate in which the ferrite powder is hardened by sintering, that is, a ferrite sintered body.

Figure 3:
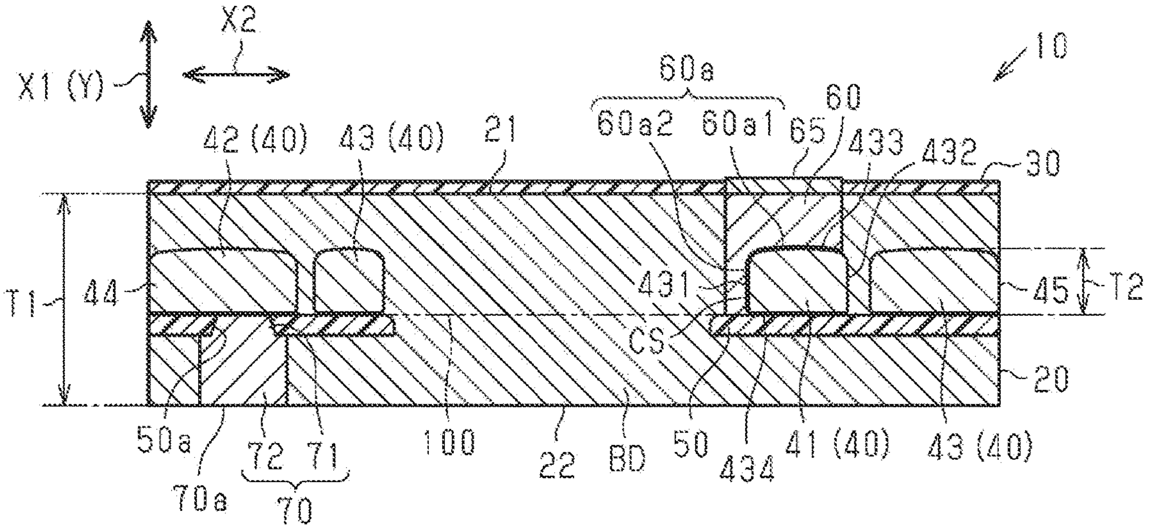
FIG. 3 is a sectional view of the inductor component.

In the embodiment shown in FIG. 1, the body BD has a substantially parallelepiped shape. The shape of the body BD is not limited to a substantially parallelepiped shape, and may be, for example, a substantially circular columnar shape or a substantially polygonal shape. Among side surfaces of the body BD, an upper surface shown in FIG. 3 is called a "first principal surface 21". Among the side surfaces of the body BD, a principal surface that is positioned on a side opposite to the first principal surface 21 with an inductor wire 40 (described later) interposed therebetween is called a "second principal surface 22".

As shown in FIG. 3, when a dimension of the body BD in a direction in which the first principal surface 21 and the second principal surface 22 are disposed side by side is a thickness T1 of the body BD, the thickness T1 is about 0.15 mm or greater and about 0.3 mm or less (i.e., from about 0.15 mm to about 0.3 mm). That is, the interval between the first principal surface 21 and the second principal surface 22 is about 0.15 mm or greater and about 0.3 mm or less (i.e., from about 0.15 mm to about 0.3 mm). Therefore, the inductor component 10 is very thin.

As shown in FIGS. 1 and 3, the inductor component 10 includes an insulating surface layer 30 that is positioned at the first principal surface 21 of the body BD. The thickness of the surface layer 30 is smaller than the thickness T1 of the body BD. The surface layer 30 is made of resin. Examples of the resin out of which the surface layer 30 is made can include polyimide resin, epoxy resin, phenol resin, and a liquid crystal polymer. The surface layer 30 may be made of a mixture of at least two of the polyimide resin, the epoxy resin, the phenol resin, and the liquid crystal polymer. Further, in order to increase the insulation performance of the surface layer 30, the surface layer 30 may include an insulating filler, such as a silica filler. However, the surface layer 30 does not include magnetic powder.

The inductor component 10 includes the inductor wire 40 that is provided in the body BD and an insulating layer 50 that is positioned in the body BD and that is in contact with the inductor wire 40. The insulating layer 50 is disposed on the side opposite to the first principal surface 21 with the inductor wire 40 interposed therebetween.

The insulating layer 50 is a nonmagnetic body. The insulating properties of the insulating layer 50 are higher than the insulating properties of the magnetic layer 20. The insulating layer 50 includes, for example, polyimide resin, acrylic resin, epoxy resin, phenol resin, or a liquid crystal polymer. In order to increase the insulation performance of the insulating layer 50, the insulating layer 50 may include an insulating filler, such as a silica filler. Note that, in the embodiment, "nonmagnetic body" means a body having a resistivity of about 1 MΩ·cm or greater.

The inductor component 10 includes vertical wires 60 and 70 that are in contact with the inductor wire 40. The vertical wire 60 extends toward the first principal surface 21 from a contact portion of the vertical wire 60 that is in contact with the inductor wire 40 in the body BD. The vertical wire 60 is also in contact with a first external terminal 65 that is exposed at the surface layer 30. The vertical wire 70 extends toward the second principal surface 22 from a contact portion of the vertical wire 70 that is in contact with the inductor wire 40 in the body BD. An end of the vertical wire 70 is a second external terminal 70*a* that is exposed to the outside.

Next, the inductor wire 40 is described.

Figure 4:
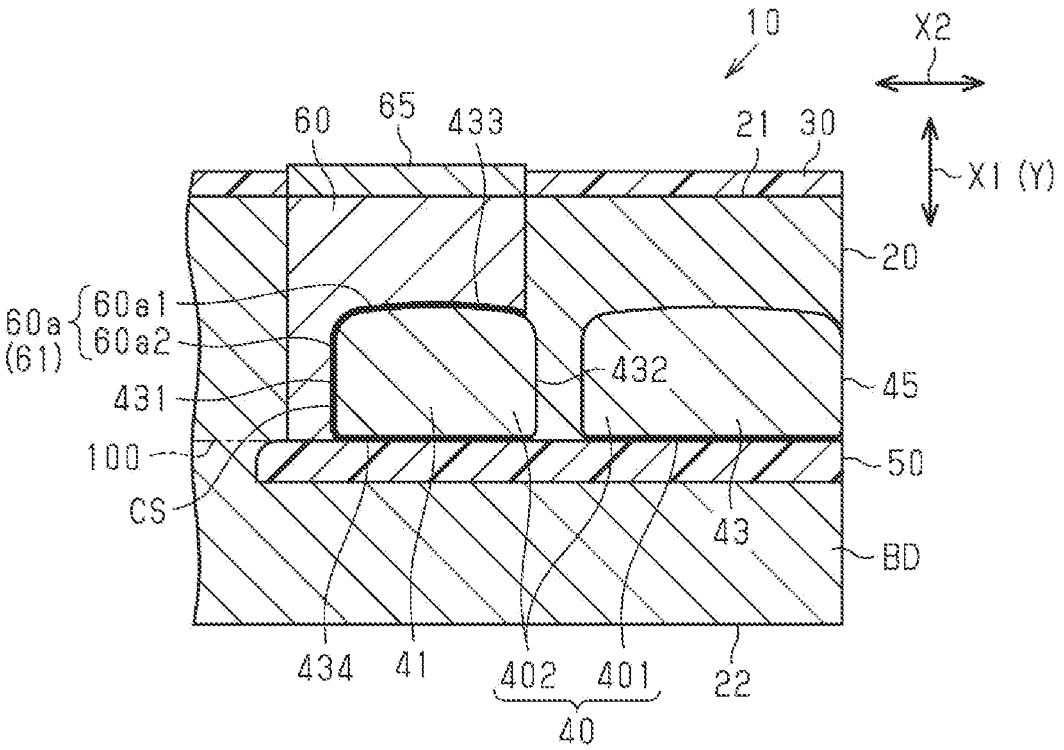
FIG. 4 is an enlarged sectional view of a portion of the inductor component.

The inductor wire 40 is made of a conductive material. The inductor wire 40 includes at least one of, for example, copper, silver, gold, and aluminum as the conductive material. The inductor wire 40 may include an alloy of at least two of copper, silver, gold, and aluminum as the conductive material. In the embodiment, as shown in FIG. 4, the inductor wire 40 includes a wire seed layer 401 that is a seed layer in contact with the insulating layer 50 and a conductive layer 402 that is positioned on a side opposite to the insulating layer 50 with the wire seed layer 401 interposed therebetween. The wire seed layer 401 includes copper as an example of the conductive material. When a dimension of the wire seed layer 401 in the direction in which the first principal surface 21 and the second principal surface 22 are disposed side by side is the thickness of the wire seed layer 401, the thickness of the wire seed layer 401 is about 30 nm or greater and about 500 nm or less (i.e., from about 30 nm to about 500 nm). The conductive layer 402 includes, for example, copper and sulfur. When the conductive layer 402 includes copper and sulfur in this way, for example, in the conductive layer 402, the ratio of copper may be about 99 wt % or greater and the ratio of sulfur may be about 0.1 wt % or greater and less than about 1.0 wt % (i.e., from about 0.1 wt % to about 1.0 wt %). Note that the inductor wire 40 need not include the wire seed layer 401.

As shown in FIG. 3, when a dimension of the inductor wire 40 in the direction in which the first principal surface 21 and the second principal surface 22 are disposed side by side is a thickness T2 of the inductor wire 40, the thickness T2 of the inductor wire 40 is about 40 μm or greater and about 55 μm or less (i.e., from about 40 μm to about 55 μm).

Note that the wire seed layer 401 may include as a layer at least one of a layer including titanium and a layer including tungsten. By forming the wire seed layer 401 into a layer having a multilayer structure in this way, it is possible to bring the inductor wire 40 and the insulating layer 50 into closer contact with each other.

Figure 2:
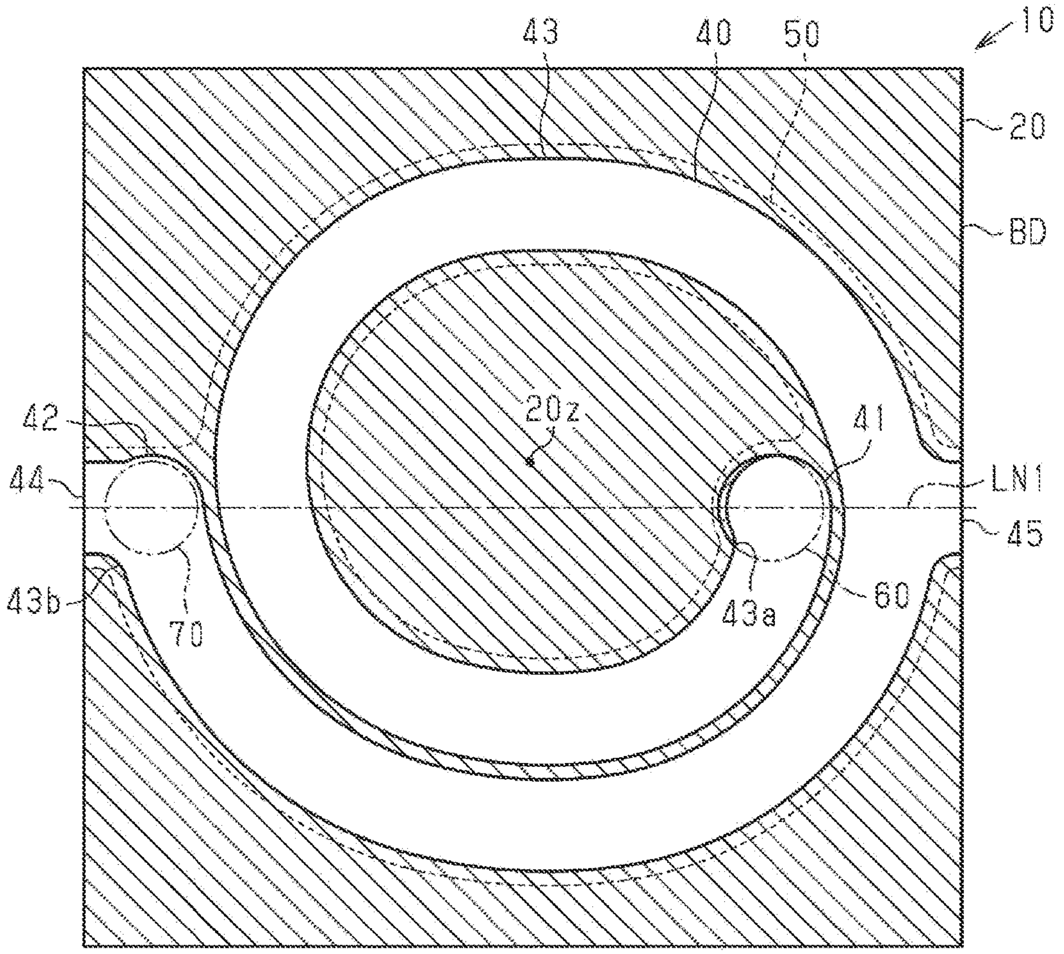
FIG. 2 is a sectional view illustrating a shape of an inductor wire of the inductor component.

As shown in FIGS. 2 and 3, the inductor wire 40 is provided along a predetermined plane 100 in the magnetic layer 20. The predetermined plane 100 is an imaginary plane that is formed by a portion of the insulating layer 50 that is in surface-contact with the inductor wire 40. Although, in the embodiment, the predetermined plane 100 is a plane that is parallel to the first principal surface 21, an imaginary plane that is not parallel to the first principal surface 21 may be the predetermined plane 100. Note that FIG. 3 illustrates a section formed by cutting the inductor component 10 in a direction orthogonal to a line LN1 indicated by an alternate long and short dashed line in FIG. 2.

Among portions of the inductor wire 40, a portion with which the vertical wire 60 is in contact is called a "first pad 41", a portion with which the vertical wire 70 is in contact is called a "second pad 42", and a portion that is positioned between the first pad 41 and the second pad 42 is called a "wire body 43". A wire width of the first pad 41 and a wire width of the second pad 42 are wider than a wire width of the wire body 43. The wire body 43 is substantially spirally formed in the predetermined plane 100 around a center axis 20*z* of the magnetic layer 20. Specifically, in top view, the wire body 43 is substantially spirally wound toward an inner peripheral end portion 43*a* on an inner side in a radial direction from an outer peripheral end portion 43*b* on an outer side in the radial direction.

Here, the number of turns of the inductor wire is determined based on an imaginary vector. The starting point of the imaginary vector is disposed on an imaginary center line extending through the center of a wire width of the inductor wire and in a direction of extension of the inductor wire. When viewed from a width direction X2 shown in FIG. 3, the imaginary vector is in contact with an imaginary center line extending in the direction of extension of the inductor wire. When the starting point of the imaginary vector that is disposed on one end of the imaginary center line is moved to the other end of the imaginary center line, and the angle by which the imaginary vector has rotated is 360°, the number of turns is determined as being 1.0 turn. Therefore, when the wire body is wound by, for example, 180°, the number of turns is 0.5 turns.

In the embodiment, the angle by which the wire body 43 of the inductor wire 40 is wound is 540°. Therefore, the number of turns by which the wire body 43 is wound in the embodiment is 1.5 turns.

The outer peripheral end portion 43*b* of the wire body 43 is connected to the second pad 42. A first dummy wire 44 extending toward an outer edge of the magnetic layer 20 along the predetermined plane 100 is connected to the second pad 42. The first dummy wire 44 is exposed at an outer surface of the inductor component 10. Similarly to the wire body 43 and the second pad 42, the first pad 41 is disposed in the predetermined plane 100. The inner peripheral end portion 43*a* of the wire body 43 is connected to the first pad 41. That is, the first pad 41 is a first end portion of the inductor wire 40, and the second pad 42 is a second end portion of the inductor wire 40.

A second dummy wire 45 extending toward an outer edge of the magnetic layer 20 along the predetermined plane 100 is connected to a location of a portion of the wire body 43 between the outer peripheral end portion 43*b* and the inner peripheral end portion 43*a* of the wire body, the location being where the wire body 43 is wound by 0.5 turns from the outer peripheral end portion 43*b*. The second dummy wire 45 is exposed at an outer surface of the inductor component 10.

Here, the inductor wire that is provided in the body BD is only the inductor wire 40 that is positioned in the predetermined plane 100. That is, the inductor wire is not provided in an imaginary plane that is positioned between a third side surface 433 of the inductor wire 40 and the first principal surface 21 and in an imaginary plane that is positioned between the plane 100 and the second principal surface 22. In other words, the inductor wire that is provided in the magnetic layer 20 is only the inductor wire 40 that is disposed in the predetermined plane 100. Therefore, in the inductor component 10 of the embodiment, the number of layers of the inductor wire is only one layer.

FIG. 4 is an enlarged view of a portion of FIG. 3. FIG. 4 is a transverse sectional view of the first pad 41 in a direction orthogonal to the direction of extension of the inductor wire 40 from the first pad 41 that is the first end portion of the inductor wire 40. Here, among the directions along the transverse section, an up-down direction in FIG. 4 that is the direction in which the first principal surface 21 and the second principal surface 22 are disposed side by side is called a thickness direction X1 of the inductor wire 40. Among the directions along the transverse section, a direction orthogonal to the thickness direction X1 is the width direction X2 of the inductor wire 40. The width direction X2 is also a direction along the predetermined plane 100.

As shown in FIG. 4, the transverse section of the first pad 41, which is a portion with which the vertical wire 60 is in contact, of the inductor wire 40 has a substantially square shape. Here, the term "substantially square shape" means that as long as the first pad 41 has four side surfaces, at least one side surface among the four side surfaces need not be linear in the transverse section. In addition, at least one side surface among the four side surfaces may have a substantially arc-shaped portion in the transverse section.

When the center in the width direction X2 of the transverse section of the first pad 41 is defined as a reference, among the side surfaces of the first pad 41, a side surface that is positioned on a first side in the width direction X2, that is, a left side surface in FIG. 4 is defined as a first side surface 431, and a side surface that is positioned on a second side in the width direction X2, that is, a right side surface in FIG. 4 is defined as a second side surface 432. Among the side surfaces of the first pad 41, a side surface that is positioned between the first side surface 431 and the second side surface 432 in the width direction X2 and that is positioned closer than both the first side surface 431 and the second side surface 432 to the first principal surface 21 in the thickness direction X1 is defined as the third side surface 433. That is, in the transverse section of the first pad 41 shown in FIGS. 4 and 5, the third side surface 433 includes a top surface 433*c*. The third side surface 433 further includes a connection portion 433*a* that is connected to the first side surface 431 and a connection portion 433*b* that is connected to the second side surface 432. In the embodiment shown in FIGS. 4 and 5, the connection portions 433*a* and 433*b* each have a substantially arc shape. The connection portion 433*a* is also a surface that connects the top surface 433*c* and the first side surface 431 to each other. The connection portion 433*b* is also a surface that connects the top surface 433*c* and the second side surface 432 to each other. Among the side surfaces of the first pad 41, a side surface that is positioned between the first side surface 431 and the second side surface 432 in the width direction X2 and that is positioned closer than both the first side surface 431 and the second side surface 432 to the second principal surface 22 in the thickness direction X1 is defined as a fourth side surface 434. That is, in the transverse section of the first pad 41 shown in FIGS. 4 and 5, the fourth side surface 434 includes a bottom surface 434*c*. The fourth side surface 434 further includes a connection portion 434*a* that is connected to the first side surface 431 and a connection portion 434*b* that is connected to the second side surface 432. In the embodiment shown in FIGS. 4 and 5, the connection portions 434*a* and 434*b* each have a substantially arc shape. The connection portion 434*a* is also a surface that connects the bottom surface 434*c* and the first side surface 431 to each other. The connection portion 434*b* is also a surface that connects the bottom surface 434*c* and the second side surface 432 to each other.

In the embodiment, the fourth side surface 434 is in surface-contact with the insulating layer 50. In the embodiment shown in FIG. 4, the bottom surface 434*c* that is a portion of the fourth side surface 434 is in surface-contact with the insulating layer 50. Note that at least a portion of the connection portion 434*a* of the fourth side surface 434 may be in contact with the insulating layer 50, or at least a portion of the connection portion 434*b* of the fourth side surface 434 may be in contact with the insulating layer 50. In contrast, the first side surface 431, the second side surface 432, and the third side surface 433 are not in contact with the insulating layer 50. When the inductor wire 40 includes the wire seed layer 401, the bottom surface 434*c* of the fourth side surface 434 is constituted by the wire seed layer 401.

As shown in FIGS. 3 and 4, in the first pad 41, the first side surface 431 is a side surface on the inner side in the radial direction, and the second side surface 432 is a side surface on the outer side in the radial direction. Here, the term “radial direction” means a radial direction in a substantially circular shape of the inductor wire 40. That is, the first side surface 431 of the first pad 41 is not adjacent to the wire body 43, whereas the second side surface 432 of the first pad 41 is adjacent to a portion of the wire body 43 that is positioned on the outer side in the radial direction with respect to the first pad 41. Therefore, in the first pad 41, of the first side surface 431 and the second side surface 432, the first side surface 431 corresponds to a surface that is positioned where the density of the inductor wire 40 becomes low. In contrast, the second side surface 432 corresponds to a surface that is positioned where the density of the inductor wire 40 becomes high.

Next, the vertical wire 70 is described.

As shown in FIG. 3, a via hole 50*a* that is a through hole is formed in, among portions of the insulating layer 50, a portion that is in contact with the second pad 42 of the inductor wire 40. The vertical wire 70 extends through the via hole 50*a* and is connected to the second pad 42.

The vertical wire 70 has a via 71 and a second substantially columnar wire 72. The via 71 is positioned in the via hole 50*a* and is adjacent to a fourth side surface 434 of the second pad 42. The second substantially columnar wire 72 is connected to, among both ends of the via 71, an end that is opposite to the second pad 42. The second substantially columnar wire 72 extends in one direction. The second substantially columnar wire 72 is thicker than the via 71. That is, the area of the section of the second substantially columnar wire 72 that is orthogonal to the thickness direction X1 is wider than the area of the section of the via 71 that is orthogonal to the thickness direction X1.

Next, the vertical wire 60 is described.

As shown in FIGS. 3 and 4, the vertical wire 60 extends in one direction from a contact portion 60*a* that is in contact with the first pad 41. In the embodiment, the vertical wire 60 is a “vertical wire” extending to the first principal surface 21 from the contact portion 60*a* that is in contact with the inductor wire 40, and a direction of extension of the vertical wire 60 is a “prescribed direction Y”. In the embodiment shown in FIGS. 3 and 4, the prescribed direction Y is the same as the thickness direction X1.

The vertical wire 60 is in contact with the first pad 41 in such a manner as to extend over both the third side surface 433 and the first side surface 431 of the first pad 41. As shown in FIG. 4, a portion of the first side surface 431 that is in contact with the vertical wire 60 is also called a “horizontal connection surface CS”.

In the section of a portion of the inductor component 10 shown in FIG. 4, of both ends of the vertical wire 60 in a left-right direction in FIG. 4, that is, of both ends in the width direction X2, a first-pad-41-side end that is a right end in FIG. 4 is positioned between the center of the first pad 41 in the width direction X2 and the second side surface 432. In contrast, of both the ends of the vertical wire 60 in the width direction X2, an end that is disposed on a side situated away from the first pad 41 and that is a left end in FIG. 4 is positioned between the first side surface 431 in the width direction X2 and a left end in FIG. 4 of the insulating layer 50. That is, when the center of the first pad 41 in the width direction X2 is defined as a reference, the end that is disposed away from the first pad 41 is positioned on an outer side with respect to the first side surface 431 in the width direction X2.

Figure 5:
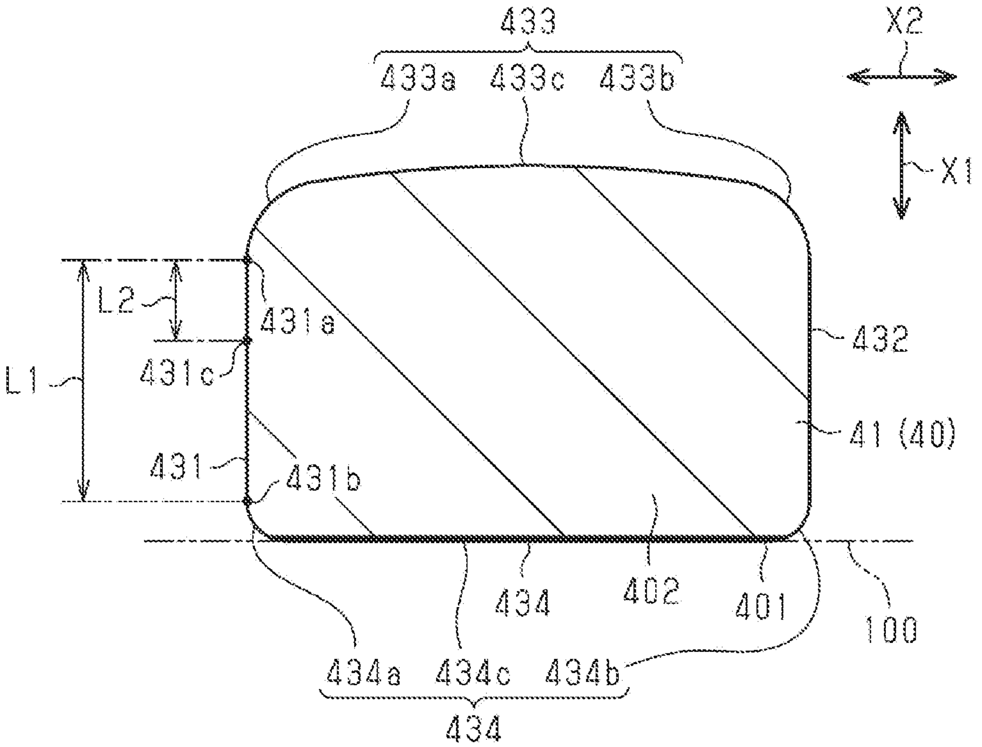
FIG. 5 is a transverse sectional view of the inductor wire of the inductor component.

As shown in FIG. 5, a length of the first side surface 431 in the prescribed direction Y is a “side surface length L1”, and a length that is substantially one third of the side surface length L1 is a “prescribed length L2”. A connection portion of the first side surface 431 that is connected to the connection portion 433*a* of the third side surface 433 is defined as a “connection portion 431*a*”, and a position that is situated toward the insulating layer 50 and away from the connection portion 431*a* by the prescribed length L2 is defined as a "prescribed position 431*c*". In this case, among portions of the first side surface 431, a portion extending from the connection portion 431*a* to the prescribed position 431*c* is in contact with the vertical wire 60. In the embodiment, the first side surface 431 of the first pad 41 is in contact with the vertical wire 60 from the connection portion 431*a* to a connection portion 431*b*. The connection portion 431*b* is a connection portion of the first side surface 431 that is connected to the connection portion 434*a* of the fourth side surface 434. Further, the connection portion 434*a* of the fourth side surface 434 is also in contact with the vertical wire 60. That is, in the embodiment, when the length of the horizontal connection surface CS in the thickness direction X1 is a horizontal connection surface length, the horizontal connection surface length is larger than about one third of the length of the first side surface 431 in the thickness direction X1. Note that the vertical wire 60 is connected to the insulating layer 50 in addition to the first pad 41 of the inductor wire 40.

As shown in FIG. 4, the contact portion 60*a* of the vertical wire 60 includes a first contact portion 60*a*1 that is in contact with the third side surface 433 and a second contact portion 60*a*2 that is in contact with the first side surface 431 and the fourth side surface 434. In the embodiment, the first contact portion 60*a*1 and the second contact portion 60*a*2 are constituted by a seed layer 61. In the embodiment, the seed layer 61 of the vertical wire 60 is called a "substantially columnar wire seed layer 61".

The substantially columnar wire seed layer 61 includes copper as an example of a conductive material. The substantially columnar wire seed layer 61 is a multilayer body including a plurality of layers that are stacked upon each other. The substantially columnar wire seed layer 61 includes, as a layer, a layer whose copper ratio is about 90 wt % or greater. The substantially columnar wire seed layer 61 includes, as a layer, a layer including palladium. Among the plurality of layers, the layer including palladium is in contact with the inductor wire 40. The thickness of the substantially columnar wire seed layer 61 is about 30 nm or greater and about 500 nm or less (i.e., from about 30 nm to about 500 nm). The thickness of the palladium layer constituting the substantially columnar wire seed layer 61 is, for example, about 1 nm or greater and about 100 nm or less (i.e., from about 1 nm to about 100 nm).

Note that the substantially columnar wire seed layer 61 may include, as a layer, at least one of a layer including titanium and a layer including tungsten. By forming the substantially columnar wire seed layer 61 into a layer having a multilayer structure, it is possible to bring the vertical wire 60 and the inductor wire 40 into closer contact with each other.

Next, the actions and effects of the embodiment are described.

(1) In the embodiment, the vertical wire 60 is in contact with the inductor wire 40 in such a manner as to extend over both the first side surface 431 and the third side surface 433. Therefore, it is possible to increase the area of the contact portion 60*a* of the vertical wire 60 compared to that when the vertical wire 60 is connected to only the third side surface 433. In addition, it is possible to bring the vertical wire 60 into contact with the inductor wire 40 from a plurality of directions. Specifically, the vertical wire 60 is in contact with the inductor wire 40 not only from the thickness direction X1 but also from the width direction X2.

Here, a comparative example in which the vertical wire is brought into contact with the inductor wire 40 when the vertical wire is brought into contact with only the third side surface 433 is considered. In this case, when an external force acts upon the vertical wire in the width direction X2, the vertical wire may slide in the width direction X2 with respect to the inductor wire 40 or may be detached from the inductor wire 40 due to the sliding of the vertical wire.

In contrast, in the embodiment, the vertical wire 60 is in contact with both the third side surface 433 and the first side surface 431 of the inductor wire 40. Therefore, when an external force acting towards the second side surface 432 from the first side surface 431 in the width direction X2, that is, an external force acting rightward in FIG. 4 acts upon the vertical wire 60, it is possible to suppress the sliding of the vertical wire 60 in the width direction X2 with respect to the inductor wire 40 by the first side surface 431 and a portion of the contact portion 60*a* of the vertical wire 60 that is in contact with the first side surface 431. As a result, it is possible to suppress the vertical wire 60 from being displaced in the width direction X2 with respect to the inductor wire 40 and suppress the vertical wire 60 from being detached from the inductor wire 40.

That is, in the embodiment, it is possible to increase the connection strength between the inductor wire 40 and the vertical wire 60.

(2) Compared to when the vertical wire 60 is connected to the inductor wire 40 by performing a via connection as when the vertical wire 70 and the inductor wire 40 are connected to each other, it is possible to increase the area of the contact portion 60*a* of the vertical wire 60. Therefore, since the vicinity of the contact portion 60*a* of the vertical wire 60 can be thicker, it is possible to suppress breakage in the vicinity of the contact portion 60*a*.

(3) The contact portion 60*a* of the vertical wire 60 is also in contact with a portion of the first side surface 431 that is disposed closer than the prescribed position 431*c* to the connection portion 431*b*. Therefore, it is possible to increase an anchoring effect that occurs between the vertical wire 60 and the inductor wire 40. That is, it is possible to increase the connection strength between the vertical wire 60 and the inductor wire 40.

(4) The vertical wire 60 is also in contact with the insulating layer 50. Therefore, it is possible to further increase the connection strength between the vertical wire 60 and the inductor wire 40.

(5) The insulating surface layer 30 is provided at the first principal surface 21 of the magnetic layer 20. Therefore, when a plurality of external terminals are provided at the first principal surface 21, it is possible to increase the insulation property between the external terminals.

(6) The contact portion 60*a* of the vertical wire 60 includes the substantially columnar wire seed layer 61 that is in contact with both the first side surface 431 and the third side surface 433. By providing the seed layer that is also in contact with the first side surface 431 in this way, it becomes easier to form the vertical wire 60 that is also in contact with the first side surface 431.

(7) The substantially columnar wire seed layer 61 includes a layer including copper. Therefore, it is possible to increase the effect of suppressing electromigration. In addition, by forming the substantially columnar wire seed layer 61 so as to include the layer including copper, it is possible to suppress an increase in manufacturing costs of the inductor component 10 and to reduce the wire resistance of the inductor wire 40 including the substantially columnar wire seed layer 61.

(8) The substantially columnar wire seed layer 61 includes a layer including palladium. Therefore, it is easier to form the layer including copper.

(9) The vertical wire 60 is in contact with, of the first side surface 431 and the second side surface 432 of the first pad 41, the first side surface 431 that is positioned where the density of the inductor wire 40 becomes low. In other words, the vertical wire 60 is not connected to, of the first side surface 431 and the second side surface 432 of the first pad 41, the second side surface 432 that is positioned where the density of the inductor wire 40 becomes high. Therefore, it is possible to suppress portions of the inductor wire 40 other than the first pad 41 from coming into contact with the vertical wire 60.

(10) When the thickness T1 of the magnetic layer 20 is less than about 0.15 mm, the inductor component 10 may be warped due to the inductor component 10 being too thin. In contrast, when the thickness T1 is greater than about 0.3 mm, the freedom with which the inductor component 10 is mounted may be reduced. In the embodiment, the thickness T1 is about 0.15 mm or greater and about 0.3 mm or less (i.e., from about 0.15 mm to about 0.3 mm). Therefore, it is possible to suppress a reduction in the freedom with which the inductor component 10 is mounted while ensuring a sufficient strength for the inductor component 10.

(11) When the thickness T2 of the inductor wire 40 is less than about 40 μm, the aspect ratio of the inductor wire 40 may become too small and the wire resistance of the inductor wire 40 may become high. In contrast, when the thickness T2 is greater than about 55 μm, a pressing force in the width direction X2 with respect to the inductor wire 40 may increase and the position of the inductor wire 40 may be displaced from a predetermined design position. The term "design position" means the position of the inductor wire 40 determined when designing the inductor component 10. In the embodiment, the thickness T2 is about 40 μm or greater and about 55 μm or less (i.e., from about 40 μm to about 55 μm). Therefore, it is possible to suppress the position of the inductor wire 40 from being displaced from the design position while suppressing an increase in the wire resistance of the inductor wire 40.

Next, an example of a method of manufacturing the inductor component 10 above is described with reference to FIGS. 6 to 22. The manufacturing method in the embodiment is a method utilizing a semi-additive method.

Figure 6:
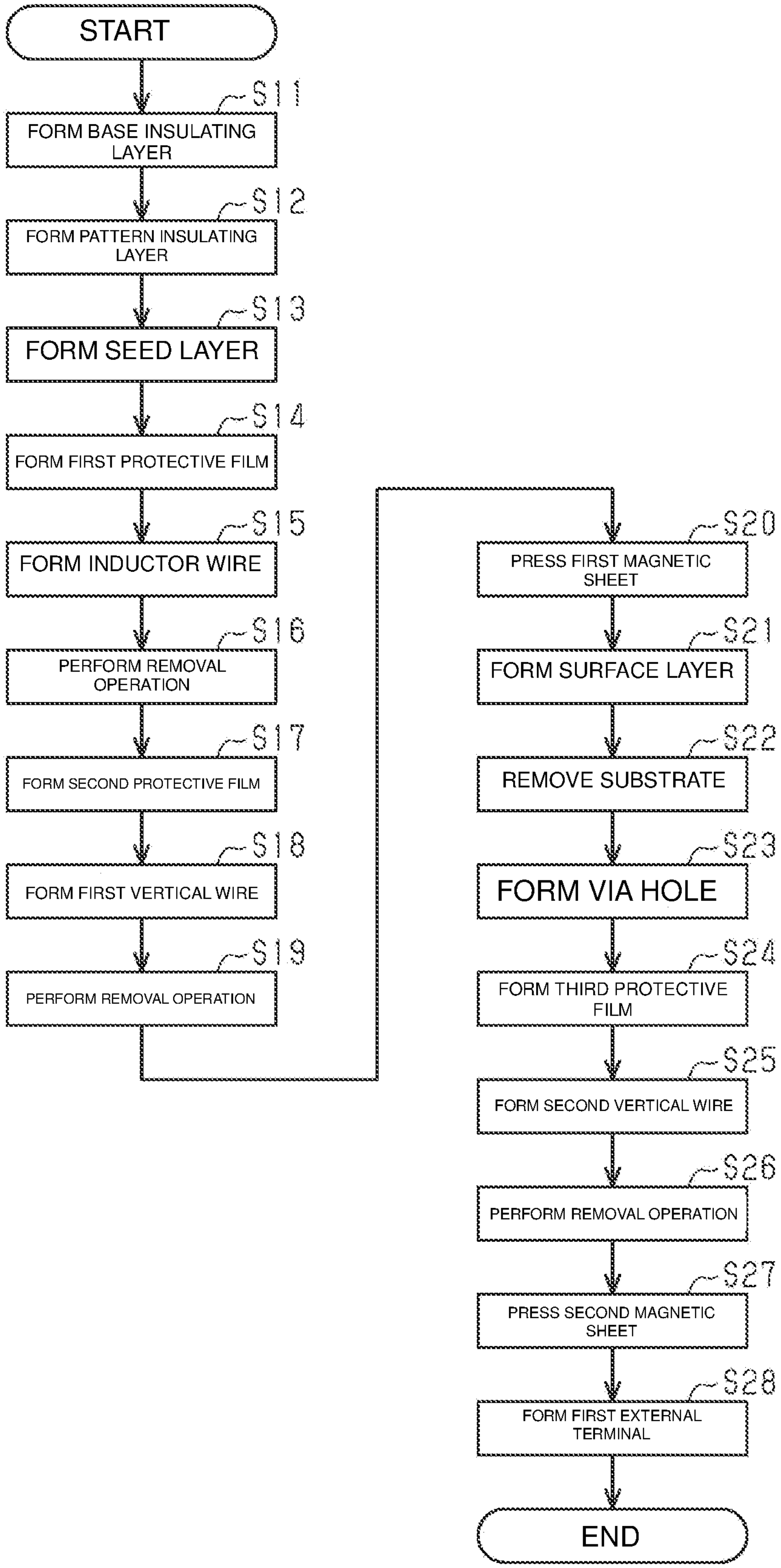
FIG. 6 is a flowchart describing an example of a method of manufacturing the inductor component.
Figure 7:
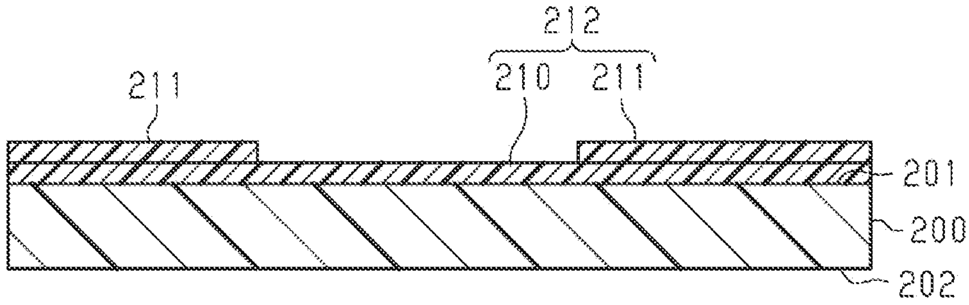
FIG. 7 is an explanatory view of the method of manufacturing the inductor component.

As shown in FIG. 6, in Step S11, which is a first step, a base insulating layer 210 is formed on a substrate 200. As shown in FIG. 7, the substrate 200 has a substantially plate shape. Examples of the material of the substrate 200 include ceramic. In FIG. 7, a top surface of the substrate 200 is a front surface 201 and a lower surface of the substrate 200 is a back surface 202. The base insulating layer 210 is formed on the substrate 200 so as to cover the entire front surface 201 of the substrate 200. The base insulating layer 210 is made of a nonmagnetic material that is the same as the material of the insulating layer 50 that constitutes the inductor component 10. The base insulating layer 210 is formed by, for example, coating the front surface 201 of the substrate 200 with a polyimide varnish containing a trifluoromethyl group and silsesquioxane by spin coating.

When the formation of the base insulating layer 210 is completed, the process proceeds to the next Step S12. In Step S12, as shown in FIG. 7, a pattern insulating layer 211 is formed on the base insulating layer 210. At least an upper portion in FIG. 7 of the pattern insulating layer 211 constitutes the insulating layer 50 of the inductor component 10. For example, by subjecting a nonmagnetic insulating resin to patterning on the base insulating layer 210 by photolithography, the pattern insulating layer 211 can be formed. In this case, the pattern insulating layer 211 is formed by using a polyimide varnish that is of the same type as that used in forming the base insulating layer 210.

Figure 8:
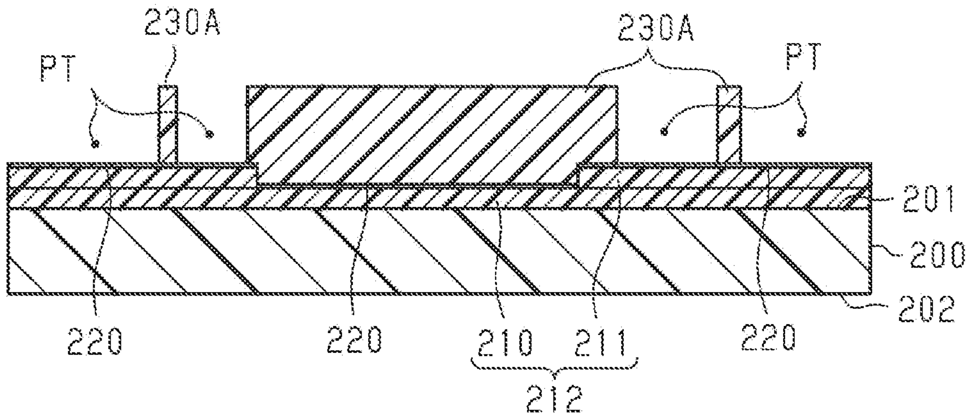
FIG. 8 is an explanatory view of the method of manufacturing the inductor component.

When the formation of the pattern insulating layer 211 is completed, the process proceeds to the next Step S13. In Step S13, a seed layer 220 is formed. That is, as shown in FIG. 8, the seed layer 220 is formed so as to cover the entire upper surface in FIG. 8 of an insulating layer 212 at the time of manufacturing, the insulating layer 212 including the base insulating layer 210 and the pattern insulating layer 211. For example, the seed layer 220 including copper is formed. For example, in Step S13, the seed layer 220 having a thickness of about 200 nm is formed. Of portions of the seed layer 220, a portion of a portion that is positioned on the pattern insulating layer 211 becomes the wire seed layer 401 constituting the inductor wire 40.

When the formation of the seed layer 220 is completed, the process proceeds to the next Step S14. In Step S14, the entire seed layer 220 is coated with a photoresist. For example, the seed layer 220 is coated with the photoresist by spin coating. Next, exposure with an exposure device is performed. Therefore, among portions of the photoresist, a portion corresponding to the position at which the conductive layer 402 is to be formed can be removed by a developing operation (described later), and the other portions are hardened. Note that when a negative resist is used as the photoresist, an exposed portion of the photoresist is hardened and the other portions can be removed. In contrast, when a positive resist is used as the photoresist, an exposed portion of the photoresist can be removed and the other portions are hardened. By controlling the exposed portion of the photoresist, it is possible to harden a portion of a portion that is adhered to the insulating layer 212 at the time of manufacturing. Next, by performing the developing operation using a developer, as shown in FIG. 8, the portion of the photoresist corresponding to the position at which the conductive layer 402 is formed is removed. The hardened portion of the photoresist remains on the seed layer 220 as a first protective film 230A. By subjecting the first protective film 230A to patterning on the seed layer 220 in this way, a wire pattern PT is formed. The wire pattern PT has the form of an opening that corresponds to the shape of the inductor wire 40 of the inductor component 10.

Figure 9:
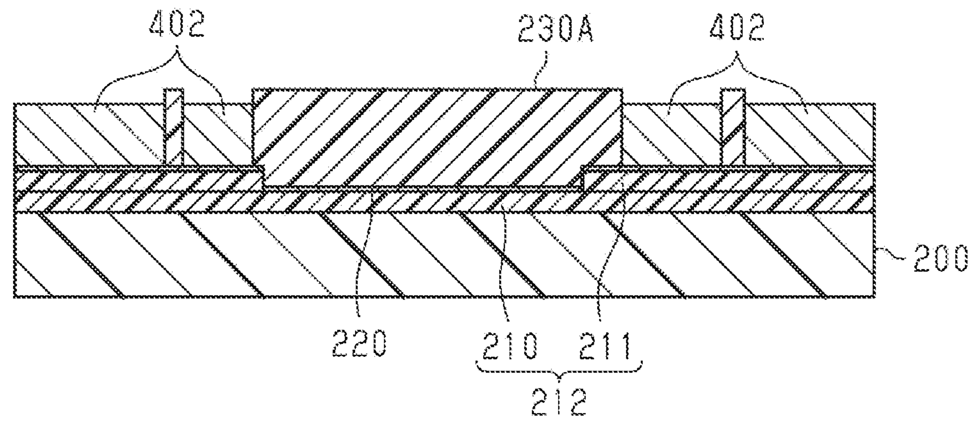
FIG. 9 is an explanatory view of the method of manufacturing the inductor component.

When the formation of the wire pattern PT ends, the process proceeds to the next Step S15. In Step S15, by supplying a conductive material into the wire pattern PT, the conductive layer 402 is formed as shown in FIG. 9. For example, by performing electrolytic copper plating using a copper sulfate aqueous solution, primarily, copper and a very small amount of sulfur are deposited onto an exposed portion of the seed layer 220. Therefore, the conductive layer 402 is formed. Since a copper sulfate aqueous solution is used, the conductive layer 402 includes sulfuric acid. The inductor wire 40 is formed by a portion of the seed layer 220 with which the conductive layer 402 is in contact and the conductive layer 402. That is, the portion of the seed layer 220 with which the conductive layer 402 is in contact becomes the wire seed layer 401.

Figure 10:
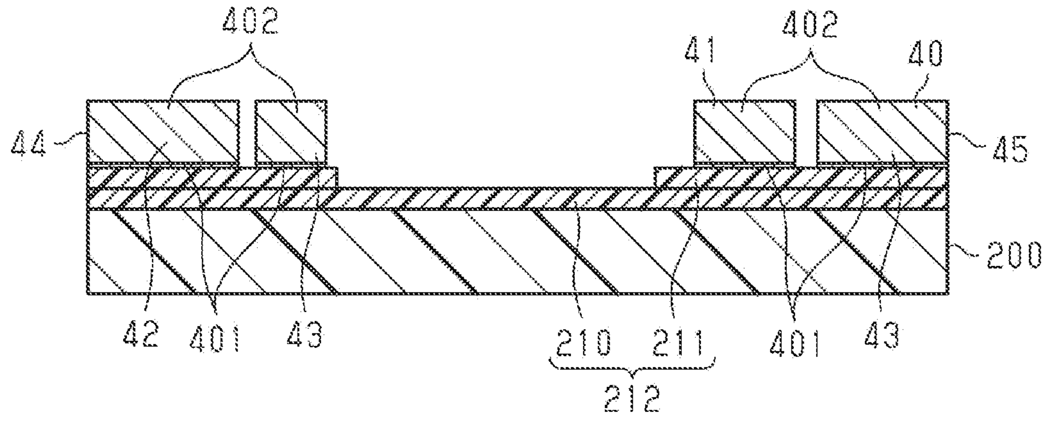
FIG. 10 is an explanatory view of the method of manufacturing the inductor component.

When the formation of the conductive layer 402 is completed, the process proceeds to the next Step S16. In Step S16, by performing an operation using a peeling liquid, as shown in FIG. 10, the first protective film 230A is removed. When the removal of the first protective film 230A is completed, a portion of the seed layer 220 that has been in contact with the first protective film 230A is removed. For example, the portion of the seed layer 220 that has been in contact with the first protective film 230A is removed by wet etching. Therefore, only the portion of the seed layer 220 that becomes the wire seed layer 401 remains.

Figure 11:
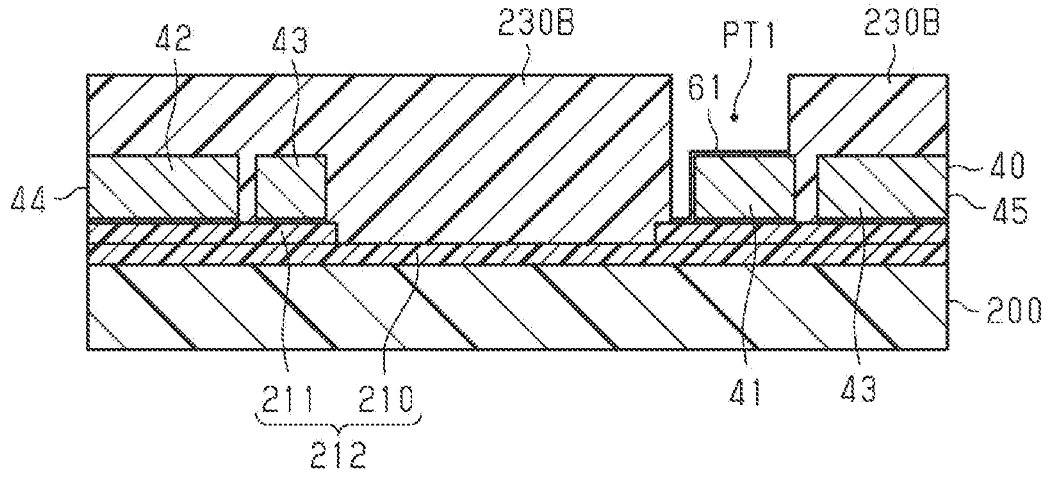
FIG. 11 is an explanatory view of the method of manufacturing the inductor component.

When the removal operation in Step S16 is completed, the process proceeds to Step S17. In Step S17, a photoresist is applied so as to conceal the inductor wire 40. For example, the photoresist is applied by spin coating. Next, exposure with an exposure device is performed. Therefore, a portion of the photoresist corresponding to the position at which the vertical wire 60 is to be formed can be removed by a developing operation described later, and the other portions are hardened. The portion of the photoresist that is to be removed by the developing operation described later is slightly displaced inward in the radial direction with respect to the first pad 41 of the inductor wire 40 shown in FIG. 11. Next, as shown in FIG. 11, a portion of the photoresist adhered to the pattern insulating layer 211 is removed by a developing operation using a developer. The hardened portions of the photoresist remain on the insulating layer 212 at the time of manufacturing as a second protective film 230B. By subjecting the second protective film 230B to patterning on the insulating layer 212 at the time of manufacturing in this way, a vertical pattern PT1, which is a pattern for forming the vertical wire 60, is formed. When the vertical pattern PT1 is formed in this way, among the side surfaces of the first pad 41, at least a portion of each of the third side surface 433, the first side surface 431, and the fourth side surface 434, which are portions with which the vertical wire 60 comes into contact, are exposed.

Figure 12:
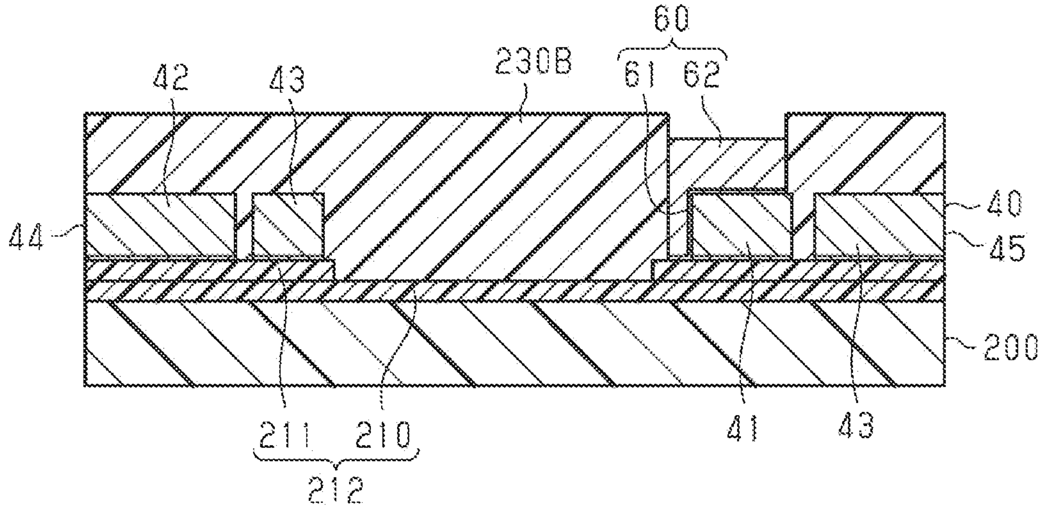
FIG. 12 is an explanatory view of the method of manufacturing the inductor component.

When the formation of the vertical pattern PT1 is completed, the process proceeds to the next Step S18. In Step S18, as shown in FIG. 11, the substantially columnar seed layer 61 is formed. For example, the substantially columnar seed layer 61 including copper is formed by sputtering. For example, in Step S18, the substantially columnar seed layer 61 having a thickness of about 200 nm is formed. In the embodiment, the substantially columnar seed layer 61 that adheres to both the third side surface 433 and the first side surface 431 of the inductor wire 40 is formed. Then, by supplying a conductive material into the vertical pattern PT1, a first column 62 that is a conductive column is formed as shown in FIG. 12. By performing, for example, electrolytic copper plating using a copper sulfate aqueous solution as described above, the first column 62 is formed. Since a copper sulfate aqueous solution is used, the first column 62 includes a very small amount of sulfur. The vertical wire 60 is formed from the first column 62 and the substantially columnar seed layer 61.

Figure 13:
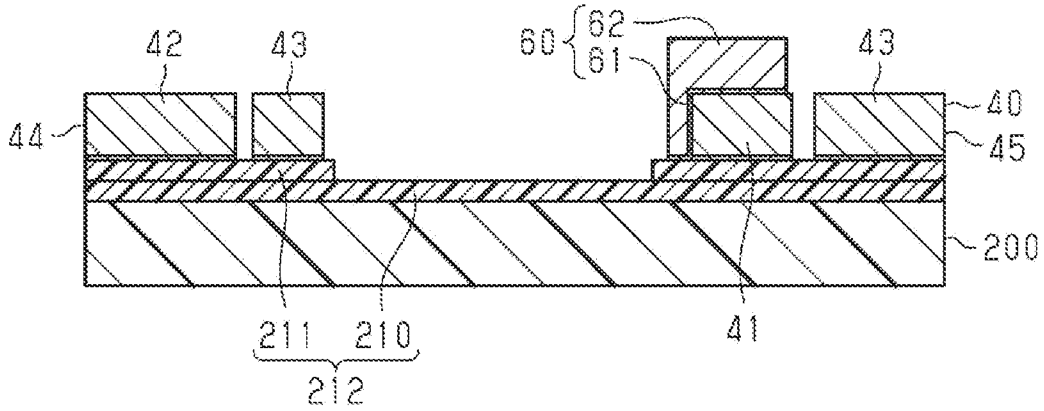
FIG. 13 is an explanatory view of the method of manufacturing the inductor component.

When the formation of the vertical wire 60 is completed, the process proceeds to the next Step S19. In Step S19, by performing an operation using a peeling liquid, as shown in FIG. 13, the second protective film 230B is removed. Note that when the second protective film 230B is removed, a portion of the substantially columnar wire seed layer 61 may be exposed. Therefore, after removing the second protective film 230B, the exposed portion of the substantially columnar wire seed layer 61 is removed by, for example, wet etching.

Figure 14:
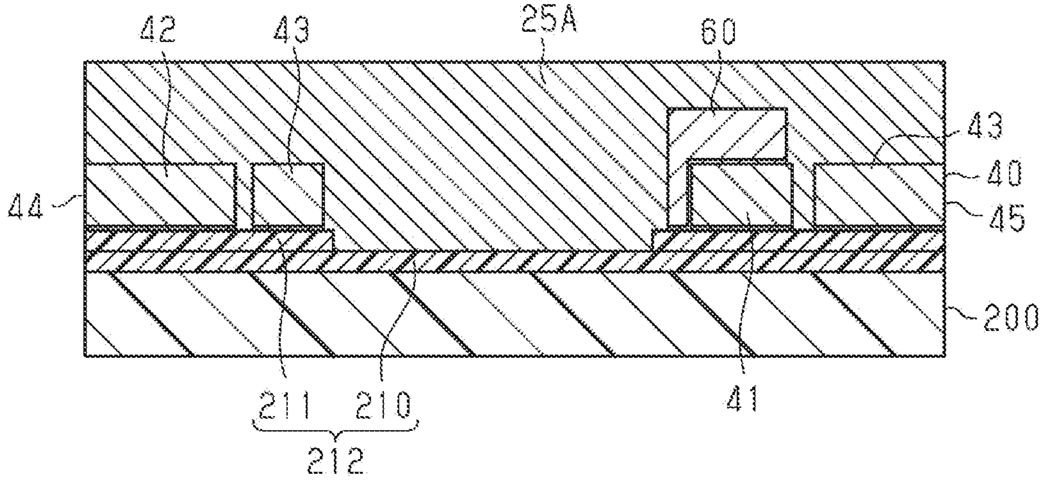
FIG. 14 is an explanatory view of the method of manufacturing the inductor component.
Figure 15:
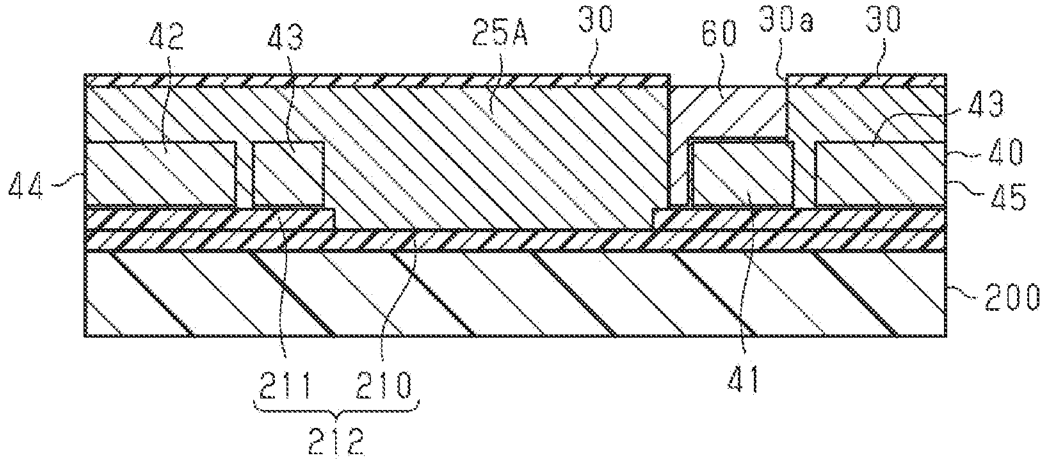
FIG. 15 is an explanatory view of the method of manufacturing the inductor component.

When the removal operation in Step S19 is completed, the process proceeds to Step S20. In Step S20, a first magnetic sheet 25A shown in FIG. 14 is pressed from above in FIG. 14. Therefore, the inductor wire 40 and the vertical wire 60 are buried in the first magnetic sheet 25A. The first magnetic sheet 25A that is pressed from above in FIG. 14 in Step S20 may be a sheet including a single layer, or a multilayer body including a plurality of layers that are stacked upon each other. Next, as shown in FIG. 15, an upper side in FIG. 15 of the first magnetic sheet 25A is grinded until, of both ends of the vertical wire 60, an end on a side that is not in contact with the inductor wire 40 becomes visible from an upper side in FIG. 15.

When the pressing of the first magnetic sheet 25A and the grinding of the first magnetic sheet 25A are completed, the process proceeds to the next Step S21. In Step S21, as shown in FIG. 15, the surface layer 30 is formed at an upper surface in FIG. 15 of the first magnetic sheet 25A. For example, the surface layer 30 can be formed by subjecting a nonmagnetic insulating resin to patterning on the first magnetic sheet 25A by photolithography. Next, a through hole 30*a* is formed at a position on the surface layer 30 at which the first external terminal 65 is to be formed. For example, the through hole 30*a* can be formed by illuminating the surface layer 30 with laser.

Figure 16:
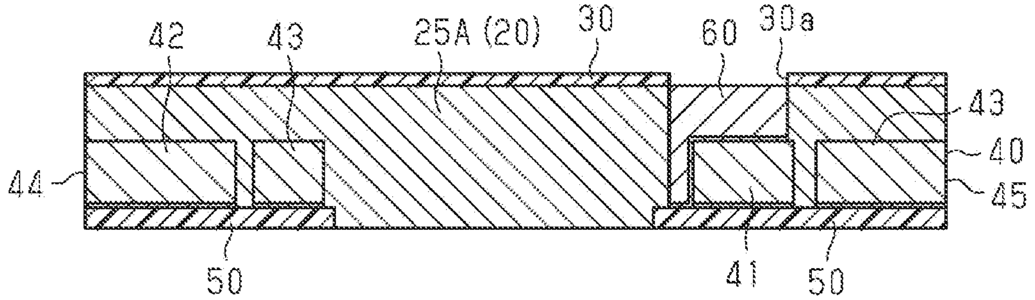
FIG. 16 is an explanatory view of the method of manufacturing the inductor component.

When the formation of the surface layer 30 is completed, the process proceeds to the next Step S22. In Step S22, as shown in FIG. 16, the substrate 200 and the base insulating layer 210 are removed by grinding. Here, a portion of the pattern insulating layer 211 may be removed. A portion of the pattern insulating layer 211 remaining after this removal operation becomes the insulating layer 50 of the inductor component 10.

Figure 17:
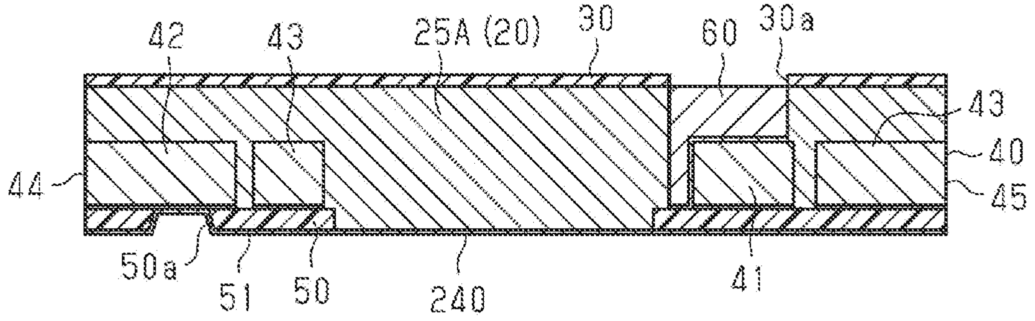
FIG. 17 is an explanatory view of the method of manufacturing the inductor component.

When the grinding is completed, the process proceeds to the next Step S23. In Step S23, as shown in FIG. 17, the via hole 50*a* is formed in the insulating layer 50. For example, the via hole 50*a* is formed by illuminating the insulating layer 50 with laser.

Figure 18:
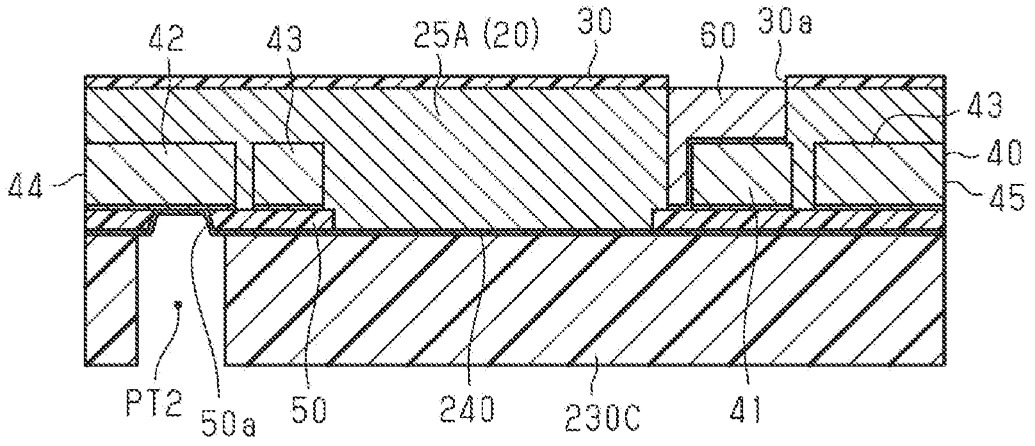
FIG. 18 is an explanatory view of the method of manufacturing the inductor component.

When the formation of the via hole 50*a* is completed, the process proceeds to the next Step S24. In Step S24, as shown in FIG. 17, a seed layer 240 is formed on a side of the first magnetic sheet 25A, the side of the first magnetic sheet 25A being opposite to the side at which the surface layer 30 is provided. The seed layer 240 is also called an "opposite-side seed layer 240". For example, the opposite-side seed layer 240 including copper is formed by sputtering. In this case, copper adheres to both a surface 51 and a peripheral wall defining the via hole 50*a* of the insulating layer 50, the surface 51 being positioned on a side opposite to the position of the inductor wire 40. Next, the entire opposite-side seed layer 240 is coated with a photoresist. For example, the opposite-side seed layer 240 is coated with the photoresist by spin coating. Next, exposure with an exposure device is performed. Therefore, a portion of the photoresist adhered to the position at which the vertical wire 70 is to be formed can be removed by a developing operation described later, and the other portions are hardened. Next, by performing the developing operation using a developer, as shown in FIG. 18, the portion of the photoresist corresponding to the position at which the vertical wire 70 is to be formed is removed. The hardened portions of the photoresist remains as a third protective film 230C. By subjecting the third protective film 230C to patterning on the opposite-side seed layer 240 in this way, a vertical pattern PT2, which is a pattern for forming the vertical wire 70 of the inductor component 10, is formed.

Figure 19:
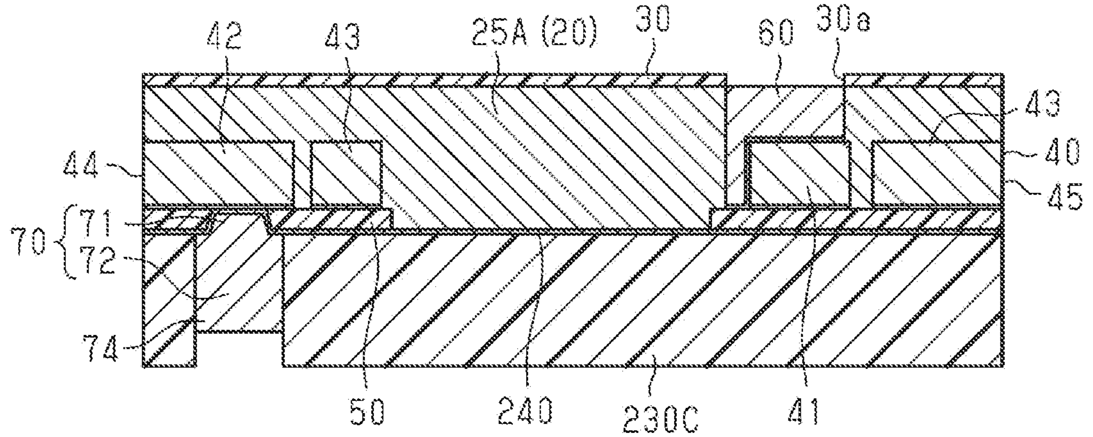
FIG. 19 is an explanatory view of the method of manufacturing the inductor component.

When the formation of the vertical pattern PT2 ends, the process proceeds to the next Step S25. In Step S25, by supplying a conductive material into the vertical pattern PT2, a second column 74 that is a conductive column is formed as shown in FIG. 19. By performing, for example, electrolytic copper plating using a copper sulfate aqueous solution as described above, the second column 74 is formed. Since a copper sulfate aqueous solution is used, the second column 74 includes sulfur. A portion of the second column 74 that is positioned in the via hole 50*a* becomes the via 71, and a portion of the second column 74 that is positioned outside the via hole 50*a* becomes the second substantially columnar wire 72. That is, the vertical wire 70 is formed.

Figure 20:
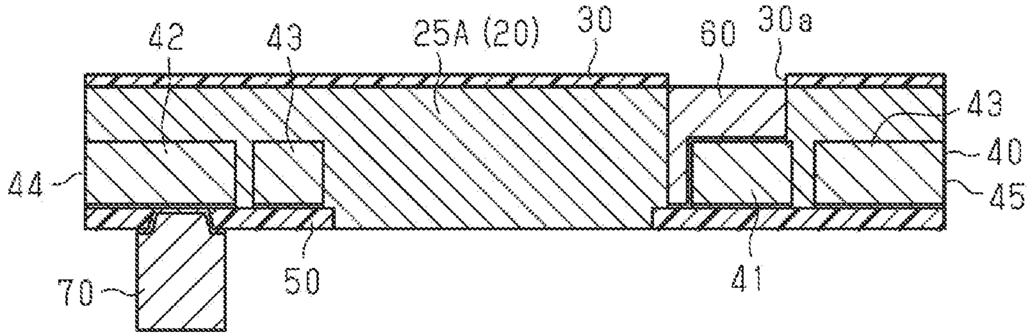
FIG. 20 is an explanatory view of the method of manufacturing the inductor component.

When the formation of the vertical wire 70 is completed, the process proceeds to the next Step S26. In Step S26, by performing an operation using a peeling liquid, as shown in FIG. 20, the third protective film 230C is removed. When the removal of the third protective film 230C is completed, a portion of the opposite-side seed layer 240 that has been in contact with the third protective film 230C is removed. For example, the portion of the opposite-side seed layer 240 that has been in contact with the third protective film 230C is removed by wet etching. Therefore, only the portion of the opposite-side seed layer 240 that constitutes the vertical wire 70 remains.

Figure 21:
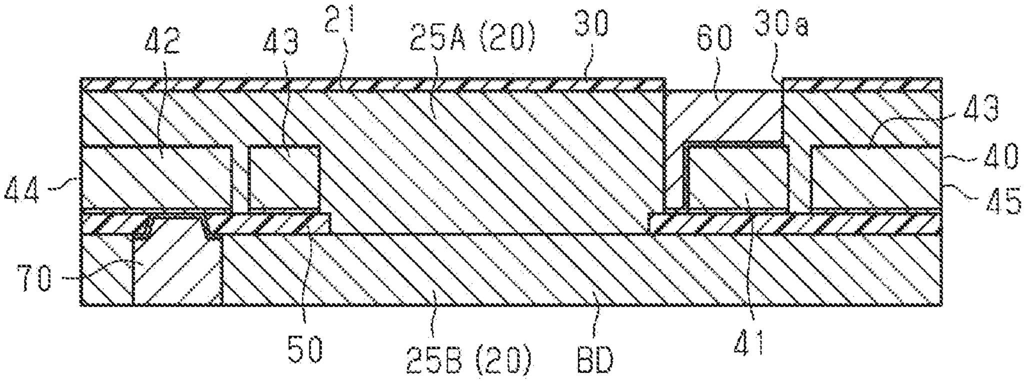
FIG. 21 is an explanatory view of the method of manufacturing the inductor component.

When the removal operation in Step S26 is completed, the process proceeds to the next Step S27. In Step S27, a second magnetic sheet 25B shown in FIG. 21 is pressed from below in FIG. 21. Therefore, the vertical wire 70 is buried in the second magnetic sheet 25B. In addition, the inductor wire 40 is sandwiched by the first magnetic sheet 25A and the second magnetic sheet 25B. The second magnetic sheet 25B that is pressed from below in FIG. 21 in Step S27 may be a sheet including a single layer, or a multilayer body including a plurality of layers that are stacked upon each other. Next, an upper side in FIG. 21 of the second magnetic sheet 25B is grinded until, of both ends of the vertical wire 70, an end on a side that is not in contact with the inductor wire 40 becomes visible from a lower side in FIG. 21. Therefore, the body BD of the inductor component 10 is formed.

Figure 22:
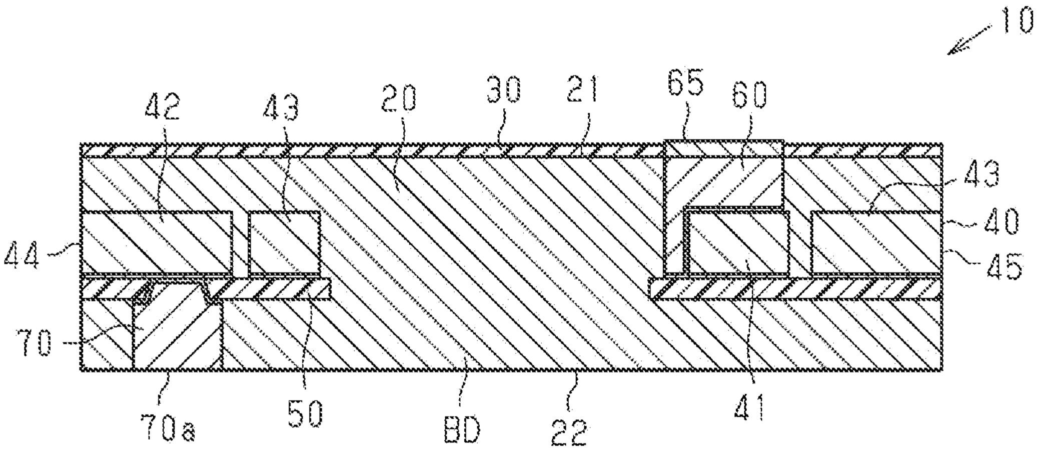
FIG. 22 is an explanatory view of the method of manufacturing the inductor component.

When the pressing of the second magnetic sheet 25B and the grinding of the second magnetic sheet 25B are completed, the process proceeds to the next Step S28. In Step S28, as shown in FIG. 22, the first external terminal 65 is formed at the surface layer 30. As a result, the process of the method of manufacturing the inductor component 10 ends.

Second Embodiment

Next, a second embodiment of an inductor component is described in accordance with FIGS. 23 to 27. In the description below, portions differing from those of the first embodiment are primarily described, and constituent members that are the same as or that correspond to those of the first embodiment are given the same reference numerals and the same descriptions are not repeated.

Figure 23:
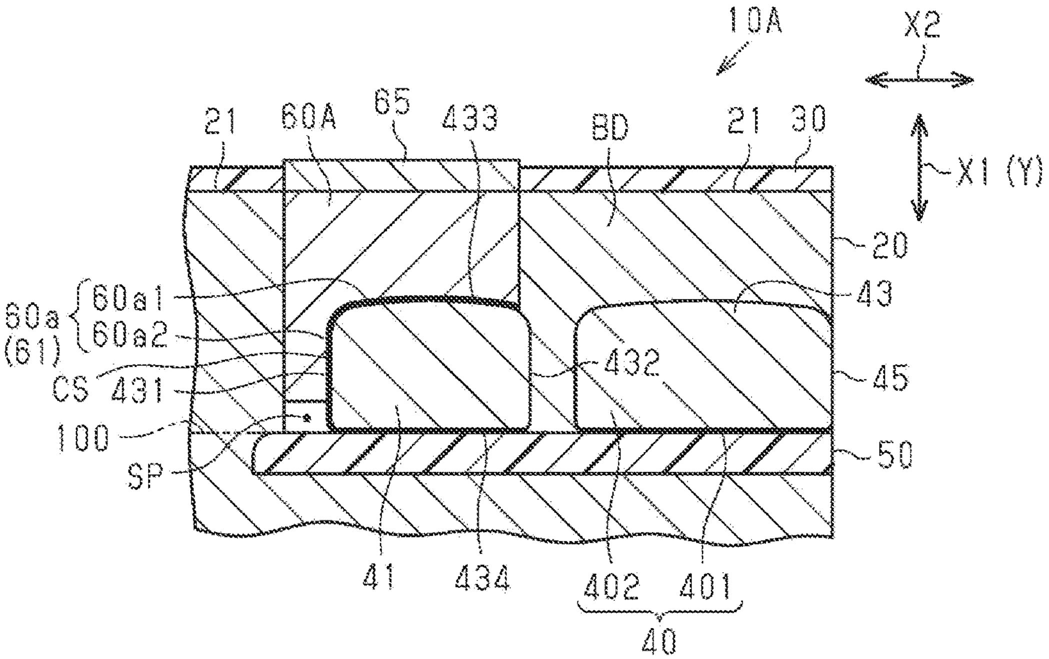
FIG. 23 is a sectional view of a portion of an inductor component according to a second embodiment.

FIG. 23 is a sectional view of a portion of an inductor component 10A according to the present embodiment. FIG. 23 illustrates a transverse section of a first pad 41 in a direction orthogonal to the direction of extension of an inductor wire 40 from the first pad 41. In the inductor component 10A, a magnetic layer 20 is made of a resin including metal magnetic powder. A vertical wire 60A is in contact with a third side surface 433 and a portion of a first side surface 431 of the inductor wire 40. The portion of the first side surface 431 that is in contact with the vertical wire 60A corresponds to a horizontal connection surface CS.

Figure 24:
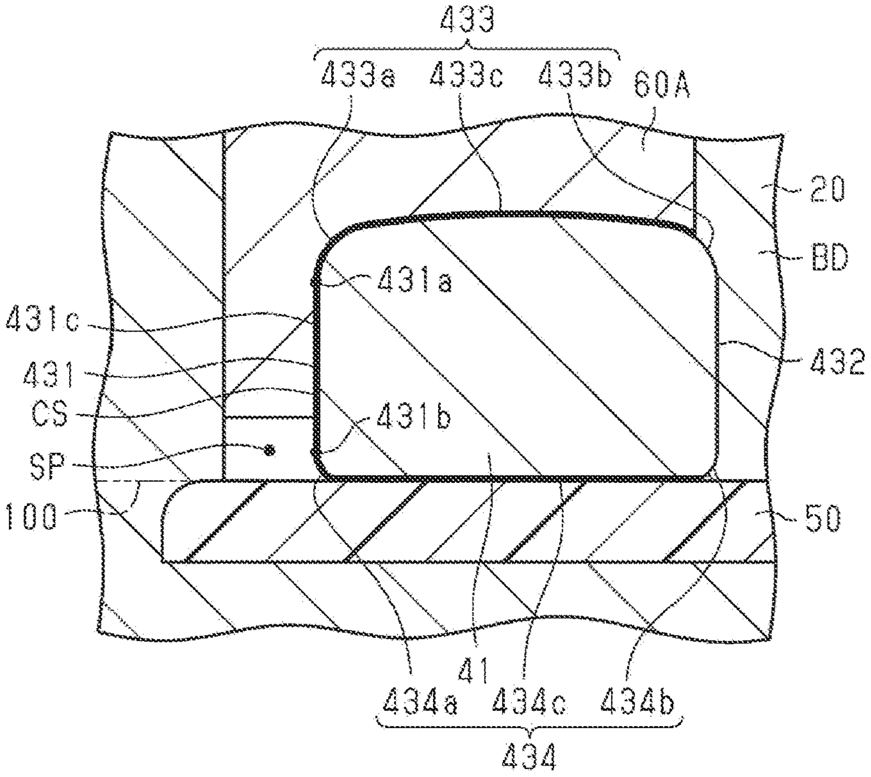
FIG. 24 is an enlarged sectional view of a portion of the inductor component.

FIG. 24 is an enlarged view of a portion of FIG. 23. In the section of the body BD shown in FIG. 24, a portion of the first side surface 431 extending from a connection portion 431*a* to a prescribed position 431*c* is in contact with the vertical wire 60A. In the embodiment, a portion of the first side surface 431 of the first pad 41 extending from the connection portion 431*a* to a position between the prescribed position 431*c* and a connection portion 431*b* is in contact with the vertical wire 60A.

In the embodiment, the vertical wire 60A is not in contact with an insulating layer 50. In the thickness direction X1, a space SP is provided between the vertical wire 60A and the insulating layer 50. That is, the space SP is provided in the body BD. The space SP is defined by the vertical wire 60A, the first side surface 431 of the inductor wire 40, the insulating layer 50, and the magnetic layer 20. Note that the size of the space SP is larger than the size of the metal magnetic powder included in the magnetic layer 20.

The embodiment can further provide the effects described below.

(12) By providing the space SP that is adjacent to the vertical wire 60A in the body BD, it is possible to reduce a stress that is generated at the vertical wire 60A when an external force is applied to the vertical wire 60A. Similarly, the space SP is also adjacent to the inductor wire 40. Therefore, it is possible to reduce a stress that is generated at the inductor wire 40 when an external force is applied to the inductor wire 40.

Next, the operations in a method of manufacturing the inductor component 10A that differ from those of the method of manufacturing the inductor component 10 are described with reference to FIG. 6 and FIGS. 25 to 27.

Figure 25:
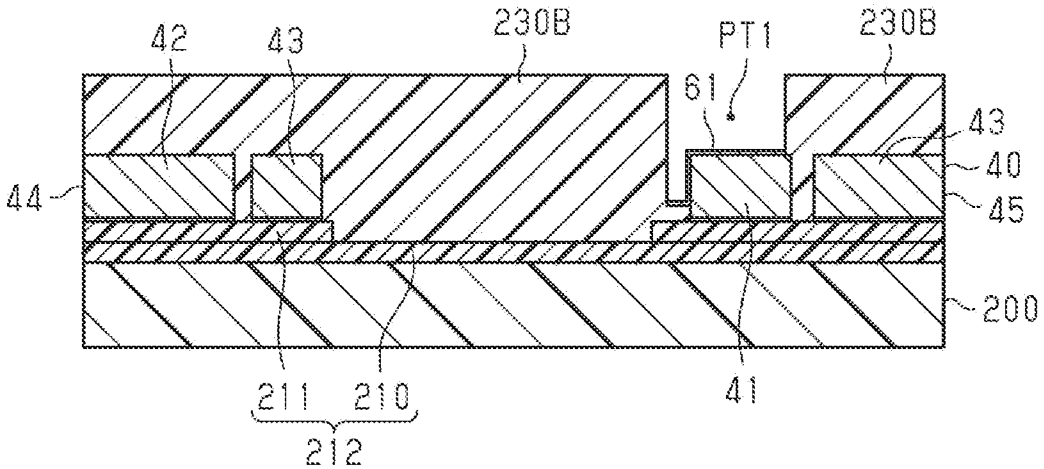
FIG. 25 is an explanatory view of an example of a method of manufacturing the inductor component.

When manufacturing the inductor component 10A, in Step S17 in FIG. 6, a second protective film 230B shown in FIG. 25 is formed. That is, the second protective film 230B is formed so that, when the center of the first pad 41 of the inductor wire 40 in the width direction X2 is defined as a reference, a portion of the insulating layer 50 that is positioned inward with respect to the first pad 41 in the width direction X2 is covered by the second protective film 230B. This can be realized by, for example, adjusting the position of a focus of exposure light when exposure with an exposure device is performed. Note that the thickness of the second protective film 230B that covers this portion of the insulating layer 50 can be adjusted by adjusting the position of the focus of the exposure light.

Figure 26:
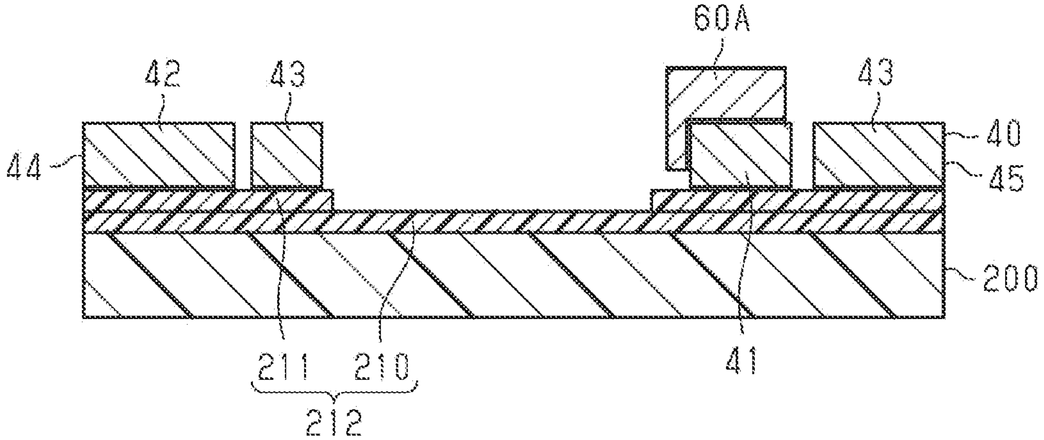
FIG. 26 is an explanatory view of the method of manufacturing the inductor component.

When the second protective film 230B shown in FIG. 25 is formed, the process proceeds to the next Step S18. In Step S18, the vertical wire 60A is formed by performing an operation that is the same as the operation performed in the first embodiment above. When, in Step S19, the second protective film 230B is removed, as shown in FIG. 26, the vertical wire 60A that is not in contact with the insulating layer 50 is formed.

Figure 27:
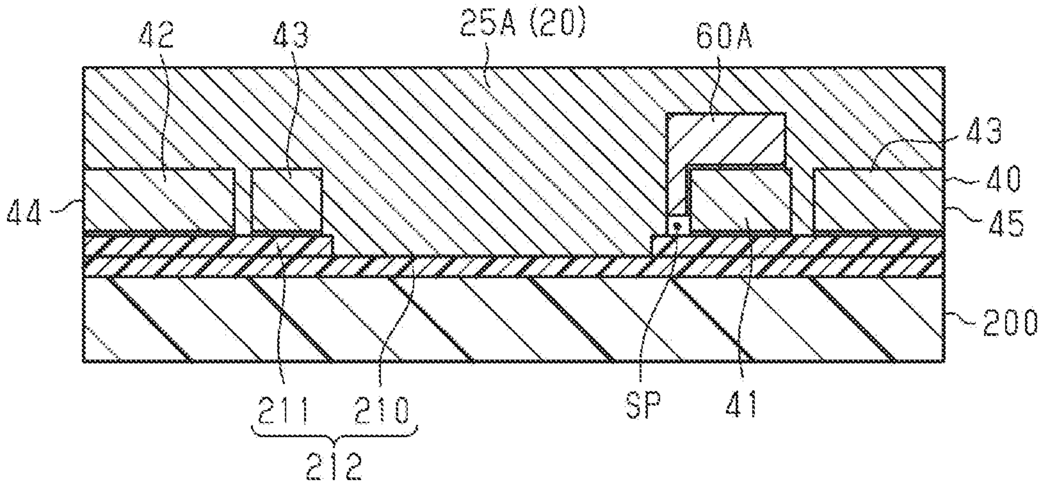
FIG. 27 is an explanatory view of the method of manufacturing the inductor component.

Then, in Step S20, a first magnetic sheet 25A shown in FIG. 27 is pressed from above in FIG. 27. Therefore, the inductor wire 40 and the vertical wire 60A are buried in the first magnetic sheet 25A, and the space SP that is defined by the vertical wire 60A, the inductor wire 40, the insulating layer 50, and the magnetic layer 20 is formed. Note that the size of the space SP can be adjusted by the magnitude of the rigidity of the first magnetic sheet 25A. That is, when a sheet having a high rigidity is used as the first magnetic sheet 25A, the space SP can be made larger than when a sheet having a low rigidity is used as the first magnetic sheet 25A.

Note that, since the operations in Step S21 onward are the same as those in the first embodiment, they are not described in detail.

Modifications

It is possible to modify and implement the embodiments above as follows. The embodiments and the modifications below can be implemented by combining them without departing from the technical scope.

Figure 28:
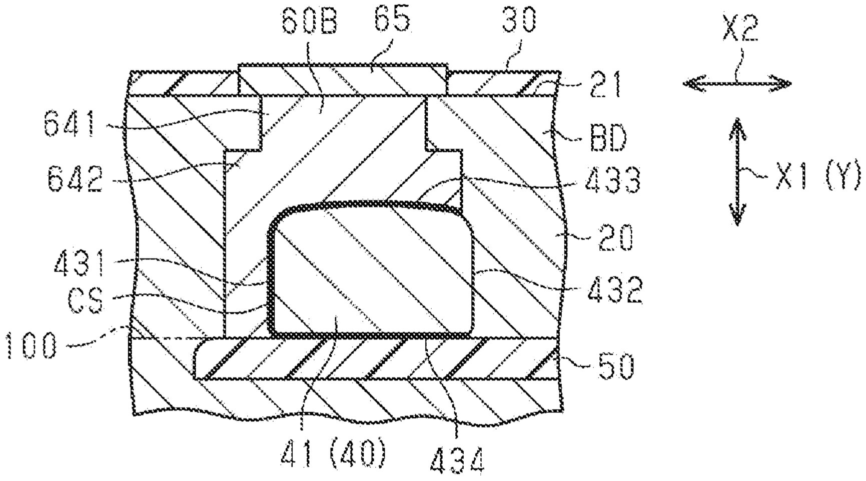
FIG. 28 is a sectional view of a portion of an inductor component according to a modification.

The vertical wire may be a vertical wire 60B including a plurality of wire portions having different thicknesses in the prescribed direction Y. For example, as shown in FIG. 28, the vertical wire 60B may include a first wire portion 641 and a second wire portion 642 that are in contact with each other in the thickness direction X1. In this case, a boundary between the first wire portion 641 and the second wire portion 642 is positioned between the third side surface 433 of the inductor wire 40 and the first principal surface 21 of the body BD in the thickness direction X1. Of the first wire portion 641 and the second wire portion 642, the first wire portion 641 that is connected to the first external terminal 65 may be thicker than the second wire portion 642. In contrast, the first wire portion 641 may be thinner than the second wire portion 642. That is, the area of the section of the first wire portion 641 that is orthogonal to the thickness direction X1 may differ from the area of the section of the second wire portion 642 that is orthogonal to the thickness direction X1. By forming the vertical wire so as to include a plurality of wire portions having different thicknesses in the thickness direction X1, it is possible to increase the freedom with which the vertical wire is designed.

Figure 29:
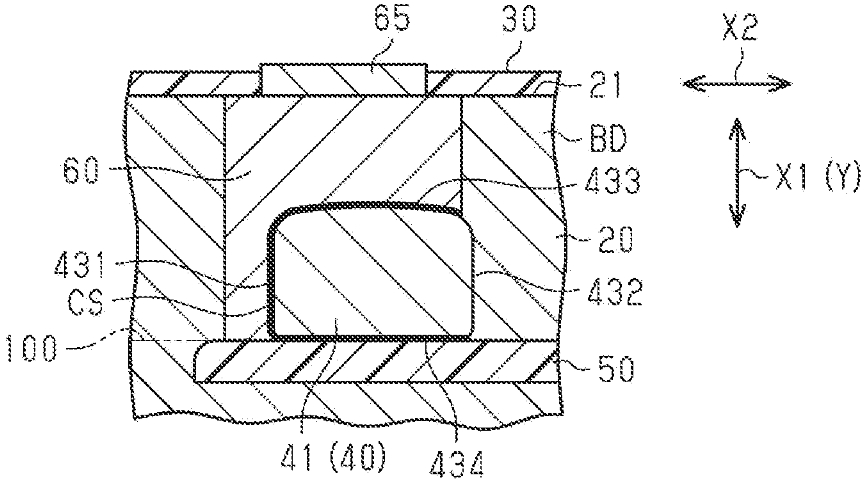
FIG. 29 is a sectional view of a portion of an inductor component according to a modification.

The diameter of the first external terminal 65 may differ from the diameters of the vertical wires 60 and 60A. For example, as shown in FIG. 29, the diameter of the first external terminal 65 may be smaller than the diameters of the vertical wires 60 and 60A. In this case, the vertical wires 60 and 60A no longer need to be designed in terms of thickness in accordance with the size of the first external terminal 65. As a result, it is possible to suppress the vertical wires 60 and 60A from becoming too thin, and to thus suppress the vertical wires 60 and 60A from breaking.

Figure 30:
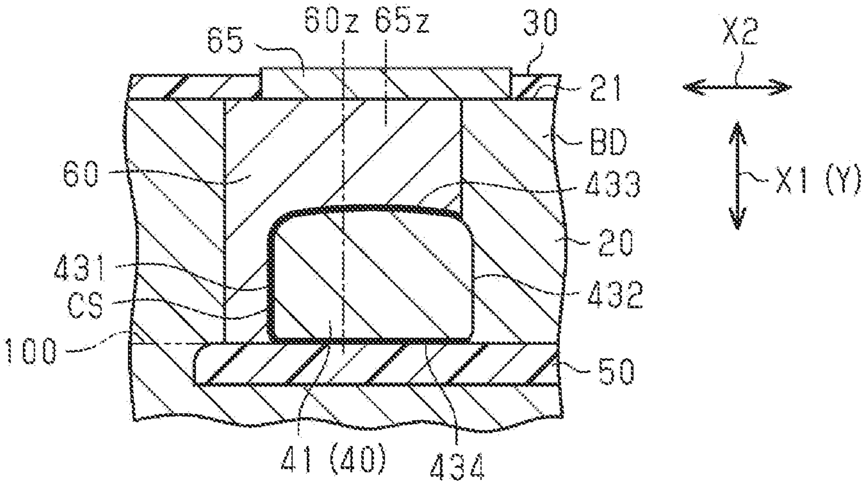
FIG. 30 is a sectional view of a portion of an inductor component according to a modification.

The center of the first external terminal 65 may be displaced from the centers of the vertical wires 60 and 60A in a direction along the first principal surface 21. That is, as shown in FIG. 30, a center axis 65*z* of the first external terminal 65 may be displaced from a center axis 60*z* of the vertical wire 60 in the direction along the first principal surface 21. The center axis 65*z* of the first external terminal 65 is a line segment of a line extending in the thickness direction X1, the line segment extending through the center of the first external terminal 65. The center axis 60*z* of the vertical wire 60 is a line segment of a line extending in the thickness direction X1, the line segment extending through the center of the vertical wire 60. For example, by displacing the center axis 65*z* of the first external terminal 65 from the center axis 60*z* of the vertical wire 60 in the width direction X2, it is possible to displace the center of the first external terminal 65 from the center of the vertical wire 60 in the width direction X2. In addition, by displacing the center axis 65*z* of the first external terminal 65 from the center axis 60*z* of the vertical wire 60 in a direction differing from the width direction X2, it is possible to displace the center of the first external terminal 65 from the center of the vertical wire 60 in the direction differing from the width direction X2.

The inductor component need not include an insulating layer 50.

The inductor component need not include a surface layer 30.

In each embodiment, the substantially columnar wire seed layer 61 is in contact with both the first side surface 431 and the third side surface 433. However, the substantially columnar wire seed layer 61 may be in contact with one of the first side surface 431 and the third side surface 433 and need not be in contact with the other of the first side surface 431 and the third side surface 433. The substantially columnar wire seed layer 61 need not be provided.

As long as the connection strength between the vertical wire 60 and the inductor wire 40 or the connection strength between the vertical wire 60A and the inductor wire 40 can be ensured, the horizontal connection surface CS, which is the connection portion of the first side surface 431 that is connected to the vertical wire 60 or the connection portion of the first side surface 431 that is connected to the vertical wire 60A, may be a portion extending from the connection portion 431*a* of the first side surface 431 to a position between the connection portion 431*a* and the prescribed position 431*c*.

The inductor component may include an insulating layer that is positioned on the second principal surface 22 of the body BD. In this case, it is desirable that an external terminal that is in contact with the vertical wire 70 be exposed from the insulating layer.

Figure 31:
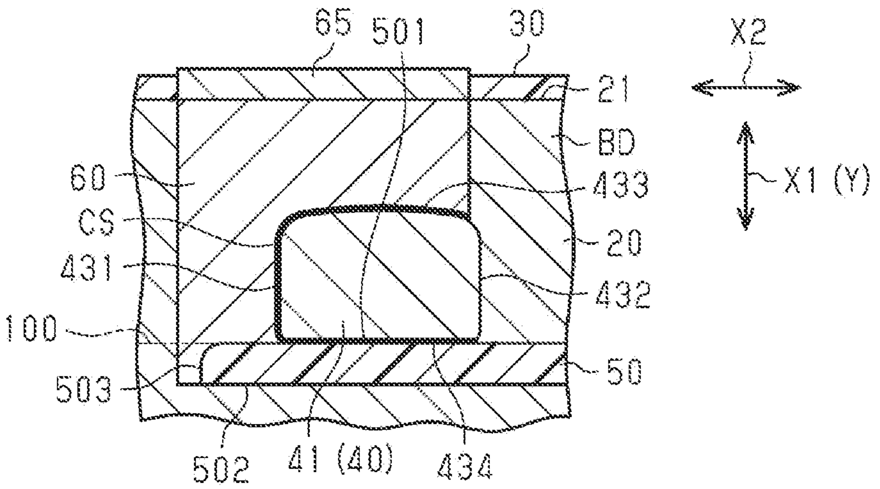
FIG. 31 is a sectional view of a portion of an inductor component according to a modification.

In the section shown in FIG. 31, the vertical wire 60 may be formed so that, of both ends of the contact portion 60*a* of the vertical wire 60 in the width direction X2, an end that is disposed on a side situated away from the first pad 41 is positioned on an outer side with respect to an end of the insulating layer 50 in the width direction X2. In this case, the vertical wire 60 is also in contact with a portion of the magnetic layer 20 that is constituted by the second magnetic sheet 25B. Note that, in FIG. 31, a top surface of the insulating layer 50, which is an upper surface in FIG. 31 of the insulating layer 50, is defined as a "first insulating principal surface 501". A lower surface in FIG. 31 of the insulating layer 50 that is a principal surface of the insulating layer 50 that is positioned between the second principal surface 22 of the body BD and the first insulating principal surface 501 in the thickness direction X1 is defined as a "second insulating principal surface 502". A side surface of the insulating layer 50 that is a side surface that connects a first-side end (a left end in FIG. 31) of the first insulating principal surface 501 in the width direction X2 and a first-side end (a left end in FIG. 31) of the second insulating principal surface 502 in the width direction X2 to each other is defined as an "insulating non-principal surface 503". In this case, the vertical wire 60 is also in contact with the insulating non-principal surface 503 and a first-side portion of the first insulating principal surface 501 of the insulating layer 50, the first-side portion being disposed in the width direction X2 with respect to the inductor wire 40.

In the inductor wire 40, as long as the interval between the first pad 41 and a portion of the wire body 43 that is adjacent to the first pad 41 in the radial direction is sufficiently wide, the vertical wire 60 or the vertical wire 60A may also be brought into contact with the second side surface 432 of the first pad 41.

Figure 32:
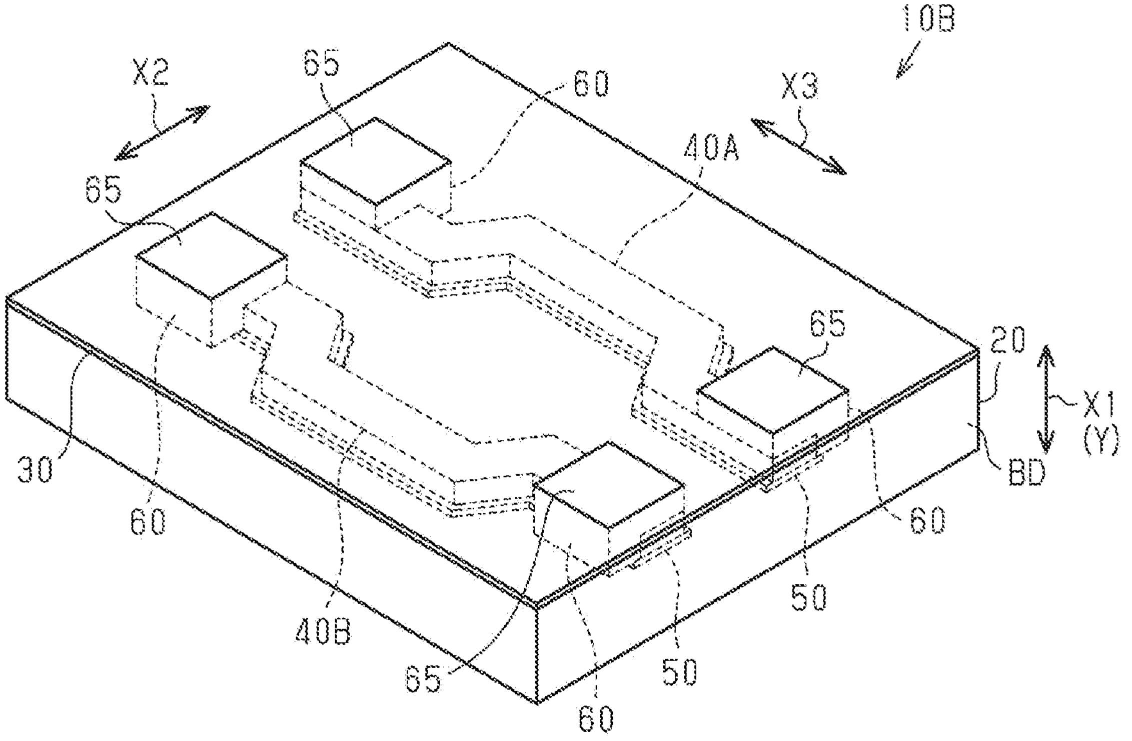
FIG. 32 is a schematic perspective view of an inductor component according to a modification.
Figure 33:
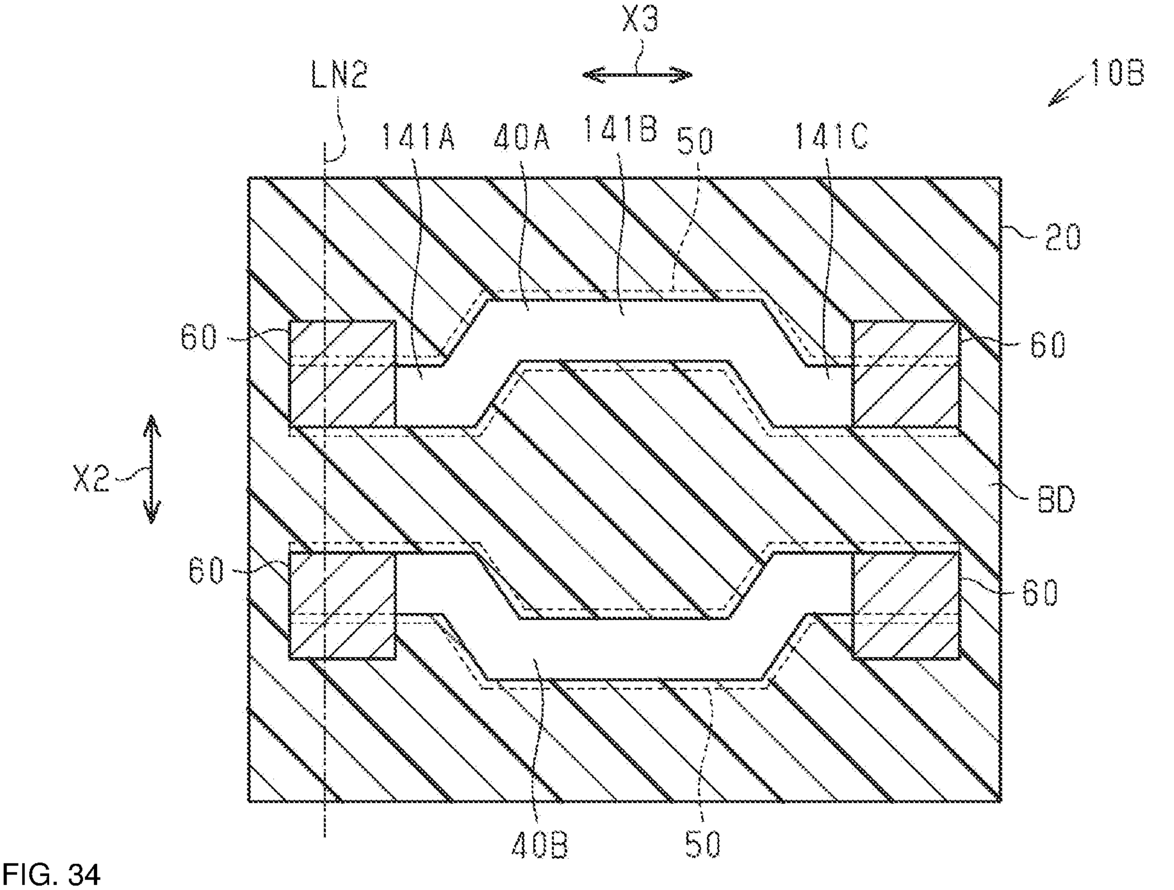
FIG. 33 is a sectional view illustrating a shape of an inductor wire of the inductor component.
Figure 34:
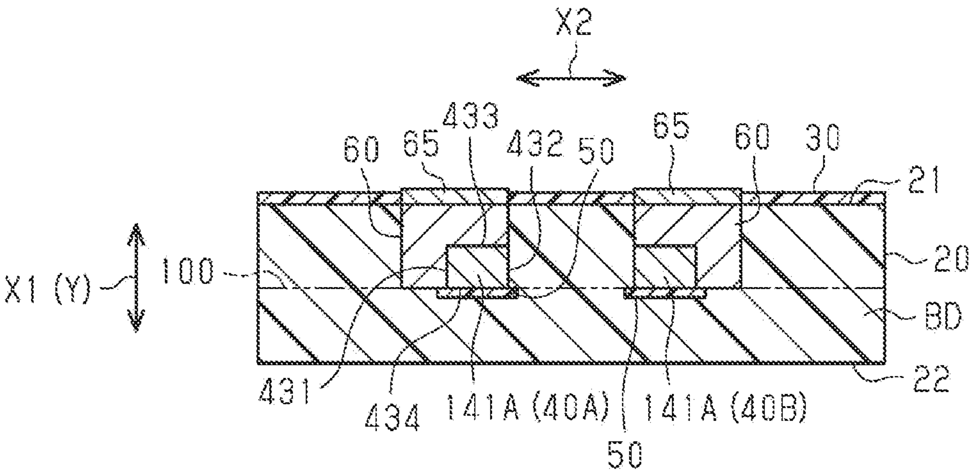
FIG. 34 is a sectional view of the inductor component.

The inductor component may include a plurality of inductor wires that are disposed in the predetermined plane 100. FIGS. 32, 33, and 34 illustrate as an example an inductor component 10B including inductor wires 40A and 40B disposed in the width direction in the predetermined plane 100. In this case, the width direction X2 is a direction in which the inductor wires 40A and 40B are disposed side by side. The inductor wires 40A and 40B each include, as portions extending in an extension direction X3 orthogonal to the width direction X2 among the directions along the predetermined plane 100, a first end portion 141A, an intermediate portion 141B, and a second end portion 141C. A connection portion between the first end portion 141A and the intermediate portion 141B of each of the inductor wires 40A and 40B may have a shape that is formed obliquely or that is curved with respect to the width direction X2 and the extension direction X3. Each first end portion 141A, each intermediate portion 141B, and each second end portion 141C may be partly or entirely curved.

FIG. 34 is a sectional view formed by cutting the inductor component 10B in a direction orthogonal to a line LN2 indicated by an alternate long and short dashed line in FIG. 33. The sectional view shows a section formed by cutting the inductor wire 40A and the vertical wire 60 in a direction orthogonal to the extension direction X3. As shown in FIG. 34, of the first side surface 431 and the second side surface 432 of the inductor wire 40A, the first side surface 431 is a surface disposed on a side situated away from the other inductor wire 40B in the width direction X2 and the second side surface 432 is a surface disposed on the side of the other inductor wire 40B. Therefore, the vertical wire 60 is in contact with the inductor wire 40A in such a manner as to extend over the first side surface 431 and the third side surface 433. Consequently, it is possible to suppress the vertical wire 60 for the inductor wire 40A from coming into contact with the other inductor wire 40B.

Note that if the interval between the inductor wire 40A and the inductor wire 40B is wide, the vertical wire 60 may be brought into contact with the inductor wire 40A in such a manner as to extend over the second side surface 432 and the third side surface 433. In addition, in this case, the vertical wire 60 may be brought into contact with the inductor wire 40A so as to be brought into contact with any of the first side surface 431, the third side surface 433, and the second side surface 432 of the inductor wire 40A.

The sectional view of FIG. 34 shows a section formed by cutting the inductor wire 40B and the vertical wire 60 in a direction orthogonal to the extension direction X3. As shown in FIG. 34, of the first side surface 431 and the second side surface 432 of the inductor wire 40B, the second side surface 432 is a surface disposed on a side situated away from the other inductor wire 40A in the width direction X2 and the first side surface 431 is a surface disposed on the side of the other inductor wire 40A. Therefore, the vertical wire 60 is in contact with the inductor wire 40B in such a manner as to extend over the second side surface 432 and the third side surface 433. Consequently, it is possible to suppress the vertical wire 60 for the inductor wire 40B from coming into contact with the other inductor wire 40A.

Note that if the interval between the inductor wire 40A and the inductor wire 40B is sufficiently wide, the vertical wire 60 may be brought into contact with the inductor wire 40B in such a manner as to extend over the first side surface 431 and the third side surface 433. In addition, in this case, the vertical wire 60 may be brought into contact with the inductor wire 40B so as to be brought into contact with any of the first side surface 431, the third side surface 433, and the second side surface 432 of the inductor wire 40B.

In the inductor component 10B shown in FIGS. 32 to 34, both end portions of each of the inductor wires 40A and 40B are in contact with the vertical wire 60. When the inductor wires 40A and 40B are provided in the width direction X2 in this way, the vertical wire 60 may be brought into contact with the first end portion 141A of the inductor wire 40A and the vertical wire 70 extending up to the second principal surface 22 may be brought into contact with the second end portion 141C of the inductor wire 40A. In this case, the vertical wire 60 may be brought into contact with the second end portion 141C of the inductor wire 40B and the vertical wire 70 may be brought into contact with the first end portion 141A of the inductor wire 40B. In this case, the vertical wire 60 that is in contact with the first end portion 141A of the inductor wire 40A is called a "first vertical wire", and the vertical wire 60 that is in contact with the second end portion 141C of the inductor wire 40B is called a "second vertical wire".

The inductor wire may have a shape differing from the shapes described in each embodiment and each modification. As long as the inductor wire is capable of providing inductance to the inductor component by causing a magnetic flux to be generated in the inductor component surroundings when an electrical current is caused to flow, the structure, the shape, the material, etc. of the inductor wire are not particularly limited. The inductor wire may have a substantially spiral shape of about 1 turn or greater, a substantially curved shape of less than about 1.0 turn, a substantially meandering shape, or various other wire shapes that are publicly known.

In the embodiments, the inductor components 10, 10A, and 10B include the respective vertical wires 60, 60A, and 60B whose prescribed direction Y is the same as the thickness direction X1. However, the inductor components 10, 10A, and 10B may include the respective vertical wires 60, 60A, and 60B whose prescribed direction Y is not the same as the thickness direction X1.

As long as an inductor component includes an inductor wire 40 and a vertical wire that is in contact with the inductor wire 40, the inductor component may have a structure differing from those of the inductor components 10, 10A, and 10B. For example, the inductor component may have a body including a first magnetic layer, an insulating layer, and a second magnetic layer that are stacked upon each other in this order in the thickness direction X1. In this case, the inductor wire is interposed between the first magnetic layer and the insulating layer, and is interposed between the second magnetic layer and the insulating layer. Further, the first magnetic layer itself may be a multilayer body including a plurality of layers that are stacked upon each other. Similarly, the second magnetic layer itself may be a multilayer body including a plurality of layers that are stacked upon each other. In the inductor component having such a structure, the first principal surface of the body is constituted by the first magnetic layer and the second principal surface of the body is constituted by the second magnetic layer. In such an inductor component, the interval between the first principal surface of the body that is constituted by the first magnetic layer and the second principal surface of the body that is constituted by the second magnetic layer may be about 0.15 mm or greater and about 0.3 mm or less (i.e., from about 0.15 mm to about 0.3 mm).

Figure 35:
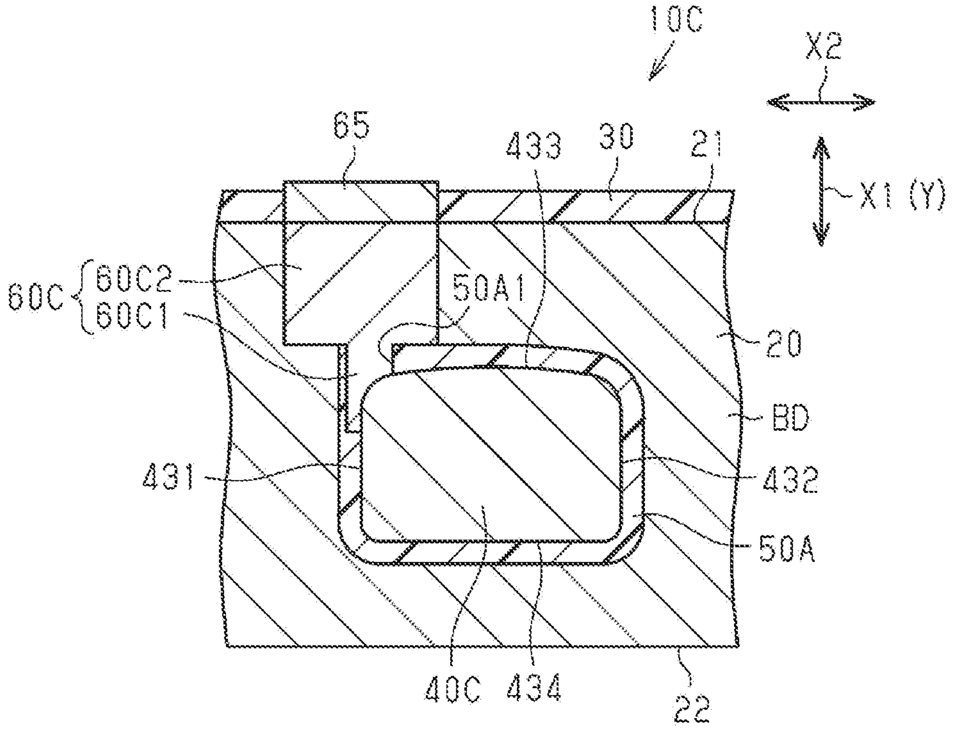
FIG. 35 is a sectional view of an inductor component according to a modification.

For example, as shown in FIG. 35, an inductor component may be an inductor component 10C including an inductor wire 40C that is covered by an insulating layer 50A. In this case, a first side surface 431 and a third side surface 433 of the inductor wire 40C are exposed to the outside of the insulating layer 50A through a via hole 50A1 that allows an inner side and an outer side with respect to the insulating layer 50A to be connected to each other. A vertical wire 60C that is in contact with the inductor wire 40C in such a manner as to extend over the first side surface 431 and the third side surface 433 is provided. The vertical wire 60C includes a via 60C1 that is positioned in the via hole 50A1 and a substantially columnar wire 60C2 that connects the via 60C1 and a first external terminal 65 to each other. In this case, the via 60C1 is adjacent to the inductor wire 40C in such a manner as to extend over the first side surface 431 and the third side surface 433. Even in this case, it is possible to increase the area of an adjacent portion of the via 60C1, the adjacent portion being adjacent to the inductor wire 40C, and to cause the via 60C1 to be adjacent to the inductor wire 40C from a plurality of directions. Therefore, it is possible to increase the connection strength between the inductor wire 40C and the vertical wire 60C.

The inductor component may be manufactured by other manufacturing methods that do not utilize the semi-additive method. For example, the inductor component may be manufactured by a sheet stacking method, a print stacking method, or the like. The inductor wire may be formed by, for example, a thin-film method, such as sputtering or deposition, a thick-film method, such as printing/coating, or a plating method, such as a full-additive method or a subtractive method. Even in this case, by bringing the vertical wire into contact with not only the third side surface of the inductor wire, but also the first side surface, it is possible to increase the connection strength between the inductor wire and the vertical wire.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a body that includes a magnetic layer and that has a first principal surface and a second principal surface;

an inductor wire that extends along a predetermined plane in the body; and a vertical wire that is provided in the body, that is in contact with the inductor wire, and that extends to the first principal surface from a contact portion of the vertical wire that is in contact with the inductor wire, wherein the second principal surface is located on a side opposite to the first principal surface with the inductor wire interposed between the second principal surface and the first principal surface, a direction along both a transverse section of the inductor wire and the predetermined plane is defined as a width direction of the inductor wire, the transverse section of the inductor wire being orthogonal to a direction of extension of the inductor wire, and a direction orthogonal to the width direction of the inductor wire, among directions along the transverse section of the inductor wire, is defined as a thickness direction of the inductor wire, and the inductor wire includes:

a first side surface that is located on a first side in the width direction, a second side surface that is located on a second side in the width direction, a third side surface that is located between the first side surface and the second side surface in the width direction, and that is located closer to the first principal surface in the thickness direction than both the first side surface and the second side surface, and a fourth side surface that is located between the first side surface and the second side surface in the width direction, and that is located closer to the second principal surface in the thickness direction than both the first side surface and the second side surface, and the vertical wire is in contact with the inductor wire so as to extend over the first side surface and the third side surface.

2. The inductor component according to claim 1, wherein a portion of the first side surface that is in contact with the vertical wire is defined as a horizontal connection surface, a length of the horizontal connection surface in the thickness direction is defined as a horizontal connection surface length, and the horizontal connection surface length is greater than about one third of a length of the first side surface in the thickness direction.

3. The inductor component according to claim 1, comprising:

an insulating layer that is provided in the body, wherein the insulating layer is in contact with the fourth side surface of the inductor wire, and the insulating layer is in contact with the vertical wire.

4. The inductor component according to claim 3, wherein the insulating layer is out of contact with the first side surface of the inductor wire.

5. The inductor component according to claim 4, wherein in a section of the body including the inductor wire and the vertical wire and being orthogonal to the direction of extension of the inductor wire, when a center of the inductor wire in the width direction is defined as a reference, an end of the vertical wire is positioned on an outer side in the width direction with respect to an end of the insulating layer.

6. The inductor component according to claim 5, wherein the insulating layer has a first insulating principal surface that is a principal surface with which the inductor wire is in contact, a second insulating principal surface that is a principal surface that is positioned between the first insulating principal surface and the second principal surface in the thickness direction, and an insulating non-principal surface that is a surface that connects a first-side end of the first insulating principal surface in the width direction and a first-side end of the second insulating principal surface in the width direction to each other, and wherein the vertical wire is in contact with a first-side portion of the first insulating principal surface and the insulating non-principal surface, and the first-side portion of the first insulating principal surface is disposed on an outer side in the width direction with respect to the contact portion of the vertical wire that is in contact with the inductor wire.

7. The inductor component according to claim 1, wherein the vertical wire includes a first wire portion and a second wire portion that are in contact with each other in the thickness direction, the first wire portion and the second wire portion each is positioned between the third side surface of the inductor wire and the first principal surface in the thickness direction, and an area of a cross section of the first wire portion orthogonal to the thickness direction is different from an area of a cross section of the second wire portion orthogonal to the thickness direction.

8. The inductor component according to claim 1, further comprising:

an insulating surface layer that is positioned at the first principal surface of the body, and an external terminal that is exposed at the insulating surface layer and that is in contact with the vertical wire.

9. The inductor component according to claim 8, wherein a center of the external terminal is displaced from a center of the vertical wire in a direction along the first principal surface.

10. The inductor component according to claim 1, wherein the magnetic layer is made of a resin including metal magnetic powder, a space is provided in the body, and the space is defined by the magnetic layer, the first side surface of the inductor wire, and the vertical wire, and a size of the space is larger than a size of the metal magnetic powder.

11. The inductor component according to claim 1, wherein the contact portion of the vertical wire that is in contact with the inductor wire includes a seed layer.

12. The inductor component according to claim 11, wherein the seed layer is in contact with at least one of the first side surface of the inductor wire and the third side surface of the inductor wire.

13. The inductor component according to claim 11, wherein the seed layer includes a layer whose copper content percentage is about 90 wt % or greater.

14. The inductor component according to claim 11, wherein the seed layer includes a layer including palladium.

15. The inductor component according to claim 1, wherein a plurality of the inductor wires are provided along the predetermined plane in the body, and are disposed side by side in a disposition direction along the predetermined plane, the vertical wire is out of contact with the second side surface of the inductor wire, and at an inductor wire of the plurality of the inductor wires that is positioned on an outermost side in the disposition direction, the first side surface of the inductor wire is positioned further away than the second side surface of the inductor wire from another one of the plurality of the inductor wires in the disposition direction.

16. The inductor component according to claim 1, wherein a plurality of the inductor wires and a plurality of the vertical wires are provided in the body, the plurality of the inductor wires are disposed side by side in a disposition direction along the predetermined plane, the plurality of the vertical wires are individually provided with respect to a corresponding one of the plurality of the inductor wires, the plurality of the inductor wires includes a first inductor wire and a second inductor wire, the plurality of the vertical wires includes a first vertical wire and a second vertical wire, the first vertical wire is in contact with the first inductor wire, the second vertical wire is in contact with the second inductor wire, the second inductor wire being positioned next to the first inductor wire in the disposition direction, the first vertical wire is out of contact with the second side surface of the first inductor wire, the second vertical wire is out of contact with the first side surface of the second inductor wire, the first side surface of the first inductor wire is positioned further away than the second side surface of the first inductor wire from the second inductor wire in the disposition direction, and the second side surface of the second inductor wire is positioned further away than the first side surface of the second inductor wire from the first inductor wire in the disposition direction.

17. The inductor component according to claim 1, wherein the inductor wire has a substantially spiral shape having more than about one turn in the predetermined plane, the first side surface of the inductor wire is positioned where a density of the inductor wire is low, and the second side surface the inductor wire is positioned where the density of the inductor wire is high.

18. The inductor component according to claim 1, wherein the vertical wire is in contact with a first end portion of the inductor wire, and another vertical wire is provided in the body, is in contact with a second end portion of the inductor wire, and extends to the first principal surface or the second principal surface from a contact portion of the other vertical wire that is in contact with the inductor wire.

19. The inductor component according to claim 1, wherein the vertical wire extends from an interior of the magnetic layer, through the magnetic layer, to the first principal surface from the contact portion of the vertical wire that is in contact with the inductor wire.

20. The inductor component according to claim 1, wherein the vertical wire is positioned such that in all locations where the vertical wire is in contact with the inductor wire the magnetic layer is prevented from contacting the inductor wire by the vertical wire.

* * * * *